(12) United States Patent
Gupta et al.

(10) Patent No.: US 12,542,825 B2
(45) Date of Patent: Feb. 3, 2026

(54) ENHANCED EDGE NETWORK PEER-TO-PEER FILE DOWNLOADS

(71) Applicant: Dell Products L.P., Round Rock, TX (US)

(72) Inventors: Mukesh Gupta, Shrewsbury, MA (US); Daniel E. Cummins, Hudson, NH (US); Eric Joseph Bruno, Shirley, NY (US)

(73) Assignee: Dell Products L.P., Round Rock, TX (US)

( * ) Notice: Subject to any disclaimer, the term of this patent is extended or adjusted under 35 U.S.C. 154(b) by 7 days.

(21) Appl. No.: 18/678,476

(22) Filed: May 30, 2024

(65) Prior Publication Data

US 2025/0373686 A1 Dec. 4, 2025

(51) Int. Cl.
*H04L 67/104* (2022.01)
*H04L 9/32* (2006.01)
*H04L 67/06* (2022.01)

(52) U.S. Cl.
CPC .......... *H04L 67/104* (2013.01); *H04L 9/3247* (2013.01); *H04L 67/06* (2013.01)

(58) Field of Classification Search
None
See application file for complete search history.

(56) References Cited

U.S. PATENT DOCUMENTS

| | | | | |
|---|---|---|---|---|
| 7,809,943 B2* | 10/2010 | Seidel | ...................... | H04L 63/12 713/164 |
| 8,050,408 B2* | 11/2011 | Weis | ...................... | H04L 63/06 726/1 |
| 8,224,968 B1* | 7/2012 | Chen | ...................... | H04L 67/1063 709/227 |
| 8,261,256 B1* | 9/2012 | Adler | ...................... | G06F 3/0481 717/173 |
| 8,386,630 B1* | 2/2013 | Atzmon | ...................... | H04L 65/765 709/231 |
| 9,282,085 B2* | 3/2016 | Oberheide | ...................... | H04L 63/061 |
| 2009/0144340 A1* | 6/2009 | Ferguson | ...................... | G06Q 30/04 |
| 2013/0311612 A1* | 11/2013 | Dickinson | ...................... | H04L 67/02 709/219 |
| 2017/0272792 A1* | 9/2017 | Bachmutsky | ...................... | H04N 21/4532 |
| 2017/0330179 A1* | 11/2017 | Song | ...................... | G06Q 20/3823 |
| 2021/0271513 A1* | 9/2021 | Tiwary | ...................... | H04L 67/10 |
| 2023/0117273 A1* | 4/2023 | Giri | ...................... | H04L 67/1076 709/203 |
| 2024/0134878 A1* | 4/2024 | Scrivano | ...................... | G06F 9/4881 |
| 2024/0403407 A1* | 12/2024 | Goodman | ...................... | G06F 21/44 |

* cited by examiner

*Primary Examiner* — Jason D Cardone
(74) *Attorney, Agent, or Firm* — WOMBLE BOND DICKINSON (US) LLP

(57) ABSTRACT

Methods and systems for managing an edge compute environment comprising endpoint devices and an orchestrator are provided. An internal peer-to-peer file sharing infrastructure exclusive to the edge compute environment is established using the endpoint devices and the orchestrator. The internal peer-to-peer file sharing infrastructure exclusive to the edge compute environment is used by the endpoint devices to download configuration data from one another using a sandboxed virtual network segment that connects the endpoint devices to one another. The sandboxed virtual network segment may be a Virtual extensible Local-Area Network (VXLAN), and may be used by the endpoint devices to implement a reverse torrent protocol for downloading the configuration data.

20 Claims, 17 Drawing Sheets

ENHANCED EDGE NETWORK PEER-TO-PEER FILE DOWNLOADS

FIELD

Embodiments disclosed herein relate generally to device management. More particularly, embodiments disclosed herein relate to systems and methods to manage an edge compute environment comprising endpoint devices and an orchestrator.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components, and hosted entities such applications, may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
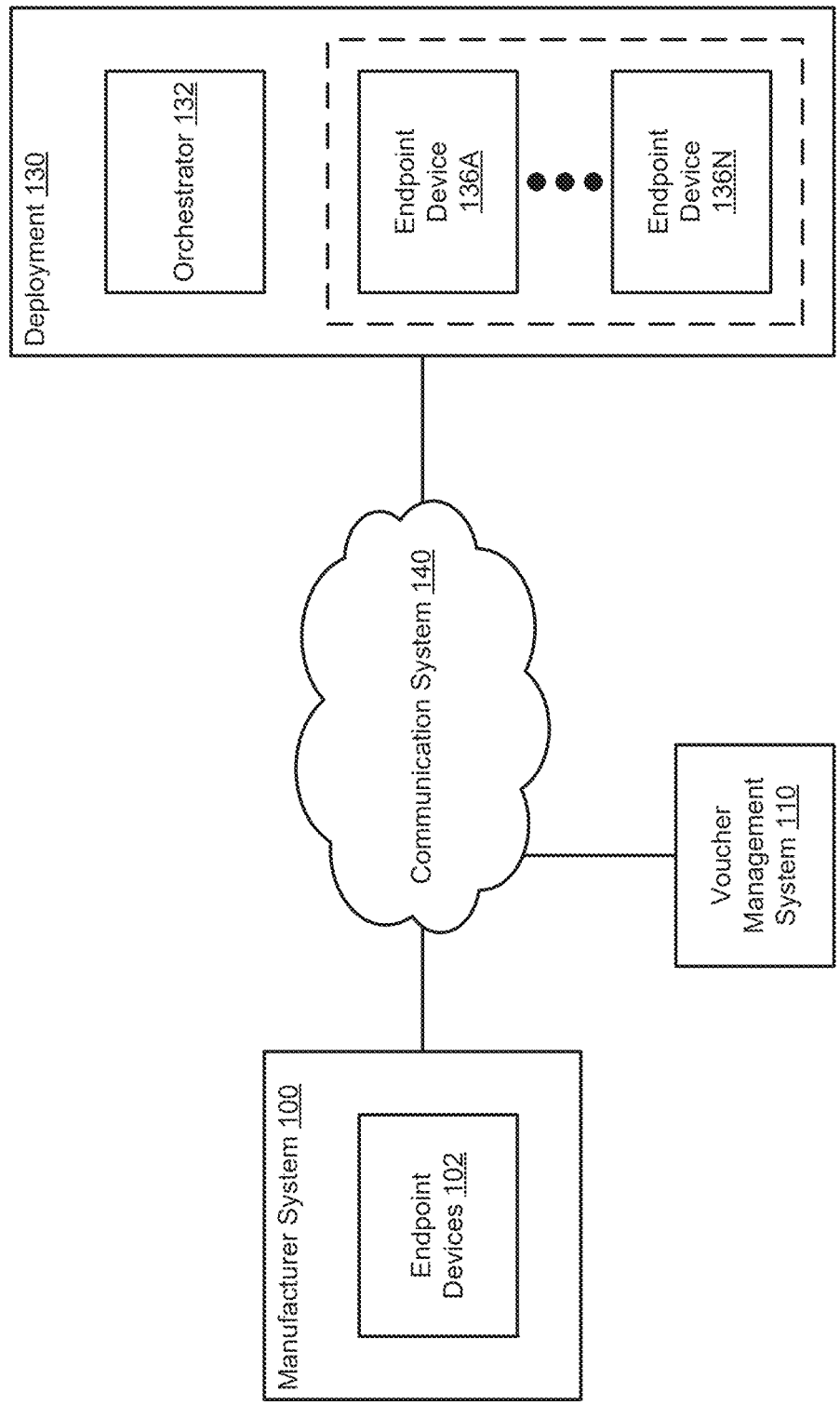
FIG. 1A shows a block diagram illustrating a system in accordance with one or more embodiments disclosed herein.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing edge compute environments. Such edge compute environments may host multiple edge endpoints (e.g., computing devices configured as endpoint devices) (which may also be referred to herein or in the art as "endpoint devices" or "edge devices") and may come in various topologies.

For example, an edge compute environment be formed by a group of computing devices installed on a submarine, on a cruise ship, on a client site as a deployment, on a corporation or business's premises, or the like. The endpoint devices of an edge compute environment may usually be connected via a local area network (LAN) and may have limited connectivity to external networks for various reasons including connectivity availability, security, policies, etc.

The edge compute environments hosting these endpoint devices may also be governed by unique constraints such as bandwidth limitations, additional pressure to control costs, security, limited presence or absence of information technology (IT) expertise, limited cloud access, and in some cases, may be air-gapped deployments with no Internet connectivity (e.g., no connectivity to any networks external to the edge compute environment). For example, an edge compute environment may be a site that is air gapped, in that the endpoint devices may not have direct outside connectivity (e.g., connectivity to external devices via a communications network such as the Internet). Such site may be air gapped because each endpoint device may not have the necessary resources for protecting itself (e.g., from malware, viruses, malicious third-party attacks) should it be exposed to such outside connectivity.

However, these endpoint devices need to be routinely configured (e.g., updated, re-booted, or the like) to provide up-to-date computer-implemented services to users of an edge compute environment. New endpoint devices deployed to an edge compute environment may also need to connect to an external source to retrieve configuration data (e.g., virtual machine (VM) images, operating system (OS) images and updates, application installation and update data, or the like). Thus, a method for efficiently and securely configuring (without exposing these endpoint devices to external threats (e.g., threats external to the air gapped or semi-air gapped edge compute environment) these endpoint devices is required.

Such a method may be subject to various considerations, such as: avoiding costs associated with additional infrastructure to hosts such configuration data locally within the edge compute environment; avoiding shipping such configuration data within hardware (e.g., hard-disk drives (HHD), solid-state drives (SSD), universal serial bus (USB) devices, or the like) to prevent stock keeping unit (SKU) proliferation; reducing upstream bandwidth and latency bottlenecks from fetching such configuration data from a centralized repository such as a cloud, data center, or other similar facilities and/or devices; providing security for an accelerated delivery approach; or the like. Former approaches such as content delivery networks (CDNs), standing up a local configuration data server, and embedding configuration data during manufacturing of the endpoint devices all carry one or more disadvantages that are to be avoided (e.g., addition of cost and footprint for remote edge compute environment locations (which is prohibitive), prevention of late binding of configuration data after a manufactured endpoint device has been shipped out, or the like).

To overcome the above-discussed challenges and provide such an improved (e.g., more efficient and secure) method for configuring these endpoint devices an internal peer-topeer file sharing infrastructure exclusive to the edge compute environment may be established using the endpoint devices and the orchestrator. Within this internal peer-to-peer file sharing infrastructure, the orchestrator may be provided as the sole connection to the external environment of the edge compute environment and as the control plane of the edge compute environment.

The orchestrator may also be configured with sufficient computing resources to protect it from external threats, and may be configured as the sole point of contact for retrieving data used to configure the endpoint devices from other devices external to the edge compute environment.

A sandboxed virtual network segment may also be overlaid onto a physical network that connects each of the endpoint devices to the orchestrator. In such a configuration, each of the endpoint devices may host a virtual machine (VM), and the sandboxed virtual network segment may be a Virtual extensible Local-Area Network (VXLAN) that connects the VMs of each of the endpoint devices to one another. Such a sandboxed virtual network segment may advantageously allow implementation of a torrent protocol (e.g., a BitTorrent® protocol) using the endpoint devices that is otherwise usually prohibited based on constraints associated with conventional edge compute environments.

In particular, due to edge constraints, strict connectivity policies are typically followed in edge compute environments. Such constraints include limited control-plane connectivity for edge devices, firewall rules that block native inbound connections to the devices, and other zero-trust connectivity constraints. As a result, torrent activity between these edge devices is usually blocked. Implementation of the sandboxed virtual network segment of embodiments disclosed herein advantageously circumvents such constraints and provides an alternative (and improved) infrastructure for allowing torrent activity between the edge devices. In particular, the sandboxed virtual network segment advantageously provides an isolated virtual network topology over the top of the constrained edge-to-server connectivity. The torrent-based peer-to-peer file sharing occurs within this sandboxed virtual network segment that is safely isolated from the native operating environment and connectivity between the edge devices and their orchestration server (e.g., the orchestrator).

Such an over-the-top virtual private network for performing trusted torrent activities (e.g., the sandboxed virtual network segment) may also advantageously achieve an improved service by providing a clear separation between the data-plane of the edge compute environment from both a control-plane and application communication plane/protocol of the edge compute environment.

A reverse torrent protocol may also advantageously be implemented. In particular, instead of a torrent client (of an endpoint device) searching for a file (e.g., configuration data) source and associated torrent file (e.g., via a non-trusted network or server), a trusted server (e.g., the orchestrator) may be provided to direct each endpoint device (namely, the torrent client of each endpoint device) to instantiate downloads of configuration data from trusted sources (e.g., other endpoint devices within a same edge compute environment) within proximity of the downloading endpoint device.

The trusted server may also provide, as an additional layer of security, torrent files that are cryptographically signed such that endpoint devices receiving such cryptographically signed torrent files are able to determine an authenticity of the torrent files. Each retrieved torrent data chunk associated with a torrent file may also be provided with additional security measures (e.g., a hash, a checksum, or the like) to ensure that each retrieved file and/or data is trusted.

As a result, an improved edge compute environment configuration may be obtained where not only are the limited computing resources of the endpoint devices are saved and used more efficiently but the endpoint devices are also secured and protected from external threats. For example, limited computing resources of the endpoint devices may now be re-directed for other uses (e.g., execution of applications, data processing for providing the computer-implemented services, or the like) rather than for ensuring secure retrieval (e.g., download) of configuration data from non-trusted sources.

Thus, embodiments disclosed herein not only directly improve the functionality (e.g., computer functionalities) of each of the endpoint devices within the edge compute environment but also provide improved security for these endpoint devices and the edge compute environment as a whole.

In an embodiment, a method for managing an edge compute environment comprising endpoint devices and an orchestrator is provided. The method may include:
establishing an internal peer-to-peer file sharing infrastructure exclusive to the edge compute environment using the endpoint devices and the orchestrator, the internal peer-to-peer file sharing infrastructure using a torrent protocol and a sandboxed virtual network segment that connects the endpoint devices to one another; and using the internal peer-to-peer file sharing infrastructure exclusive to the edge compute environment to configure one or more of the endpoint devices to allow the endpoint devices to provide one or more computer-implemented services to one or more users associated with the edge compute environment.

Each of the endpoint devices hosts a virtual machine (VM) and the sandboxed virtual network segment is a Virtual extensible Local-Area Network (VXLAN) that connects the VMs of each of the endpoint devices to one another.

The sandboxed virtual network segment is overlaid onto a physical network that connects each of the endpoint devices to the orchestrator.

The sandboxed virtual network segment isolates one or more operations of the internal peer-to-peer file sharing infrastructure from a native operating environment of each of the endpoint devices and from a connectivity between the one or more endpoint devices and the orchestrator.

Using the internal peer-to-peer file sharing infrastructure exclusive to the edge compute environment to configure the endpoint devices may include, for a first endpoint device of the endpoint devices and by the first endpoint device: receiving, by a first VM hosted within the first endpoint device, a torrent file from the orchestrator; using, by the first VM, the torrent file to retrieve one or more torrent data chunks associated with the torrent file from one or more of the endpoint devices via the sandboxed virtual network segment; merging, by the first VM, the one or more torrent data chunks into a completed data; storing, by the first VM, the completed data into a secured storage location within the first endpoint device; and using, by a first control plane agent of the first endpoint device, the completed data to configure the first endpoint device to obtain an updated first endpoint device that provides one or more computer-implemented services associated with the completed data.

The torrent file is received from the orchestrator by a first torrent client hosted by the first VM using a reverse torrent protocol, the reverse torrent protocol comprising a centrally orchestrated distributed file download mechanism where the first torrent client is directed by a trusted entity to begin retrieving the one or more torrent data chunks associated with the torrent file from one or more trusted sources instead of the first torrent client independently searching for file sources containing the one or more torrent data chunks associated with the torrent file, the trusted entity being the orchestrator and the one or more trusted sources being the endpoint devices.

The torrent file is cryptographically secured and comprises a torrent signature added by the orchestrator. Using the internal peer-to-peer file sharing infrastructure exclusive to the edge compute environment to configure the endpoint devices may include, for a first endpoint device of the endpoint devices and by further the first endpoint device: before using the torrent file to retrieve the one or more torrent data chunks associated with the torrent file, verifying, by the first VM, an authenticity of the torrent file by cryptographically verifying the torrent signature added by the orchestrator with a verification mechanism, the verification mechanism being provided to the first endpoint device when the first endpoint device was initially onboarded onto the edge compute environment.

Using the internal peer-to-peer file sharing infrastructure exclusive to the edge compute environment to configure the endpoint devices may include, for a first endpoint device of the endpoint devices and by further the first endpoint device: before merging the one or more torrent data chunks into the completed data, comparing, by the first VM, a hash of each of the one or more torrent data chunks to one or more hashes contained in the torrent file.

Using, by the first control plane agent of the first endpoint device, the completed data to configure the first endpoint device may include: sending, by the first VM and to the orchestrator, a confirmation that the completed data is available in the first endpoint device, the confirmation including information regarding the secured storage location; receiving, by the first control plane agent, a notification from the orchestrator that the completed data is available, the notification including the information regarding the secured storage location; and using, by the first control plane agent, the information regarding the secured storage location to obtain the completed data to configure the first endpoint device using the completed data.

The first control plane agent and the secured storage location are not hosted within the first VM.

A non-transitory media may include instructions that when executed by endpoint devices and an orchestrator of an edge compute environment cause the computer-implemented method to be performed.

An edge compute environment may include one or more endpoint devices and an orchestrator having the non-transitory media, and may perform the computer-implemented method when the computer instructions are executed by the one or more endpoint devices and the orchestrator.

Turning to FIG. 1A, a block diagram illustrating a system in accordance with an embodiment is shown. The system shown in FIG. 1A may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, any number of endpoint devices may be deployed to a deployment (also referred to herein as an "edge compute environment"). The endpoint devices may cooperatively provide the computer implemented services.

To manage the endpoint devices to provide the computer implemented services, authority over the endpoint devices may need to be established. In other words, the endpoint devices must be able to ascertain that they are under the authority of a particular entity. Based on this authority, the entity may, for example, issue work order and/or other types of instructions to manage the operation of the endpoint devices to provide desired computer implemented services.

To facilitate ascertaining of the authority over them, the endpoint devices may utilize secrets. The secrets may allow the endpoint devices to cryptographically verify delegations of authority over the endpoint devices from a root of trust (e.g., a trusted key of a manufacturer) to another entity (e.g., an owner).

Overtime the resources requirements for providing computer implemented services may change and/or endpoint devices may need to be replaced. For example, additional services may be desired to be provided, different types of services may be desired to be provided, etc. In another example, an endpoint device that contributed to the computer implemented services may cease to operate thereby reducing the quantity of resources available to provide the computer implemented services. To satisfy the resource requirements based on these changes to an exist systems, additional endpoint devices may be onboarded and thereby contribute to the resources available to provide the computer implemented services. Retrieval of new configuration data (e.g., virtual machine (VM) images, operating system (OS) images and updates, application installation and update data, or the like) by the endpoint devices will also be necessary to effectuate the changes required to satisfy the changes to 1 such resource requirements.

However, retrieval of these new configuration data by the endpoint devices may result in undesired exposures to threats external to the edge compute environment and may also be subjected to and limited by various constraints (e.g., security-based constraints, policy-based constraints, or the like) associated with the edge compute environment.

Thus, an improved process for managing these edge compute environments (namely, managing the endpoint devices of these edge compute environments) is provided to overcome these undesired exposures and constraints. Such an improved process (e.g., the establishment of an internal peer-to-peer file sharing infrastructure exclusive to the edge compute environment using endpoint devices and an orchestrator of the edge compute environment) is discussed in more detail below in reference to FIGS. 1B-3C.

To provide the functionality of the internal peer-to-peer file sharing infrastructure exclusive to the edge compute environment of embodiments disclosed herein, the system of FIG. 1A may include manufacturer system 100, voucher management system 110, deployment 130, and communication system 140. Each of these components is discussed below.

Manufacturer system 100 may be a system used by a manufacturer of endpoint devices 102. Manufacturer system 100 may include, for example, factories, assembly plants, distribution facilities, and/or other types of facilities for creating endpoint devices 102. Endpoint devices 102 may be data processing systems which may be usable to provide various computer implemented services.

When manufactured, manufacturer system 100 may put endpoint devices 102 in condition for subsequent onboarding to various deployments (e.g., 130) and/or other types of edge compute environments (e.g., data centers, edge systems, etc.) in which endpoint devices may be positioned to provide desired computer implemented services.

Figure 1B:
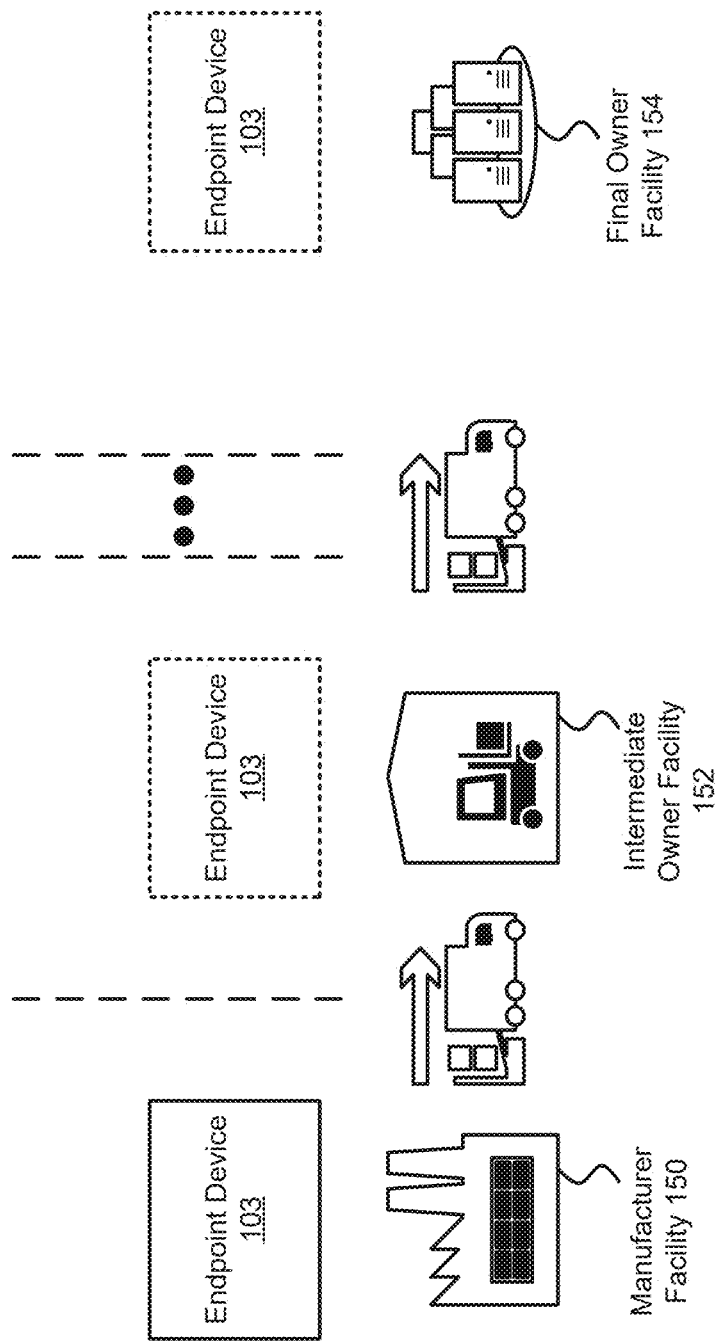
FIGS. 1B-1L show diagrams illustrating aspects of operation of the system of FIG. 1A in accordance with one or more embodiments disclosed herein.
Figure 1C:
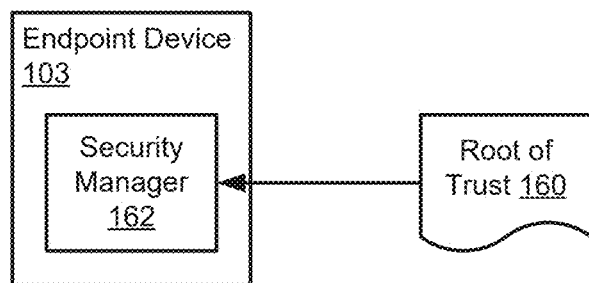

To place endpoint devices 102 in condition for subsequent onboarding and use, manufacturer system 100 may (i) establish a root of trust for each endpoint device, (ii) record various information regarding the endpoint devices (e.g., hardware/software loadout, identifiers of various components positioned therein, etc.), and (iii) install various pieces of software, establish various configuration settings, update various hardware components, and/or perform other actions so that only entities to which authority over the endpoint devices has been delegated from the root of trust are able to control and/or otherwise use the endpoint device. Refer to FIG. 1C for additional details regarding establishing a root of trust for the endpoint device.

Once constructed, endpoint devices 102 may be sold directly to end users and/or placed into the stream of commerce (e.g., sold to resellers, etc.) and through which endpoint devices 102 eventually reach end users. Refer to FIG. 1B for additional details regarding how endpoint devices may reach end users (e.g., individuals, organizations, etc.).

As ownership over the endpoint devices changes, information regarding the changes in ownership and/or authority may be recorded in an ownership voucher. The ownership voucher may allow an end user to establish authority over the endpoint device such that the endpoint device will be usable by the end user.

Voucher management system 110 may document and manage information regarding changes in ownership and authority over endpoint devices 102. To do so, voucher management system 110 may generate ownership vouchers. An ownership voucher may be a cryptographically verifiable data structure usable to establish which entities have authority over endpoint devices 102.

For example, an ownership voucher may include certificate chains that documents the changes in ownership and authority over endpoint devices 102. Each certificate may be signed using various keys. The keys used to sign (e.g., private keys) and keys included in (e.g., public keys) in ownership vouchers may enable endpoint devices to ascertain whether to trust various data structures, such as work orders which may be signed. Refer to FIGS. 1D-1I for additional information regarding ownership vouchers.

When one of endpoint devices 102 is obtained by an end user, the end user may add the endpoint devices to a collection such as deployment 130. When so added, an orchestrator (e.g., 132) or other entity may utilize a corresponding ownership voucher from voucher management system 110 to establish authority over the endpoint device. In this manner, any number of endpoint devices (e.g., 136A-136N) may be onboarded and brought under the control of a control plane which may include any number of orchestrators (e.g., 132). Different endpoint devices 136A-136N may be onboarded at different points in time and/or for different purposes.

However, the ownership voucher provided by voucher management system 110 may delegate authority over the endpoint device to the end user by establishing a public key of a public private key pair maintained by the end user (e.g., via the orchestrator 132) as having been delegated authority over the endpoint device. To issue verifiable work orders or other types of instructions to the endpoint device, the work order may need to be signed by the private key of the public private key pair.

When one of endpoint devices 102 initially powers on after manufacturing, the endpoint device may reach out to a rendezvous system (not shown). Rendezvous systems may be one or more systems that direct endpoint devices to entities such as orchestrator 132 that will onboard the endpoint devices. Rendezvous systems may be disposed external to a control plane (e.g., made up by orchestrator 132 (and a combination of other computing devices) of deployment 130).

To do so, the entities such as orchestrator 132 may provide the rendezvous systems with information usable to authenticate that orchestrator 132 will manage the endpoint devices. For example, orchestrator 132 may provide information from ownership vouchers, and/or other sources to the rendezvous systems. Once verified, the rendezvous systems may redirect endpoint devices to the corresponding entities when the endpoint devices reach out to the rendezvous systems after being powered on.

Once onboarded, endpoint devices 136A-136N may perform various operations to complete onboarding. The operations may include any number and type of operation (e.g., configuration operations, security operations, software installation operations, account establishment operations, etc.), and the operations may be directed by orchestrator 132. Once onboarded, the endpoint devices may begin to contribute to computer implemented services by deployment 130.

When providing their functionality, any of manufacturer system 100, endpoint devices 102, voucher management system 110, deployment 130, orchestrator 132, and/or endpoint devices 136A-136N may perform all, or a portion, of the processes, interactions, and methods illustrated in FIGS. 1B-3C.

Any of manufacturer system 100, endpoint devices 102, voucher management system 110, deployment 130, orchestrator 132, and/or endpoint devices 136A-136N may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), and edge device, an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 140. Communication system 140 may facilitate communications between the components of FIG. 1A. In an embodiment, communication system 140 includes one or more networks that facilitate communication between any number of components. The networks may include wired networks and/or wireless networks (e.g., and/or the Internet). The networks and communication devices may operate in accordance with any number and types of communication protocols (e.g., such as the Internet protocol).

Alternative, in embodiments, the deployment 130 may be completely (or partially) air-gapped where none of the components (or only the orchestrator 132) is able to access the communication system 140 to communicate with components and/or devices external to the deployment 130.

While illustrated in FIG. 1A as including a limited number of specific components, a system in accordance with an embodiment may include fewer, additional, and/or different components than those illustrated therein.

As discussed above, endpoint devices (e.g., 102, 136A-136N of FIG. 1A) may traverse through a stream of commerce between when the endpoint devices are manufactured and when the endpoint devices reach a final owner. Turning to FIG. 1B, diagram of an example path through a stream of commerce in accordance with an embodiment is shown.

In FIG. 1B, vertical dashed lines indicate different geographic locations in which various facilities may be positioned. Representations of such facilities (e.g., 150-154) may be positioned below the pages. Representations of movement of endpoint devices between these facilities is illustrated using truck shaped images. Some instances of the graphical representation of endpoint device 103 are illustrated using dashed outlining to indicate that endpoint device 103 may only be present at one of the facilities at any point in time, and the instance of the graphical representation of endpoint device 103 drawn in solid outlining indicates where endpoint device 103 is located in the example shown in FIG. 1B.

The stream of commerce may begin, for example, at manufacturer facility 150. Manufacturer facility 150 may be a facility operated by a manufacturer of endpoint devices. During manufacturing, the manufacturer may establish a root of trust for an endpoint device (e.g., 103). Refer to FIG. 1C for additional details regarding establishing the root of trust for endpoint device 103. The root of trust may be used by endpoint device 103 to discern which entities have authority over it, which entities to trust, and/or for other purposes. The initial root of trust may indicate that the manufacturer is the owner of and has authority over endpoint device 103.

Once the root of trust is established, endpoint device 103 may be sold and resold to various intermediate owners. These intermediate owners may operate various intermediate owner facilities (e.g., 152), such as warehouses, distribution centers, sales rooms, etc. When sold, endpoint device 103 may be shipped to these various facilities.

Finally, once purchased from an intermediate owner, a final owner may operate a final owner facility (e.g., 154), such as a data center, edge deployment, and/or other type of computer deployment to which endpoint device 103 may be onboarded. To facilitate onboarding, voucher management system 110 may collect and add information regarding changes in ownership of endpoint device 103 to an ownership voucher. Orchestrator 132 may use the ownership voucher to establish authority over endpoint device 103.

Turning to FIG. 1C, a diagram of an example process for establishing a root of trust in endpoint device 103 in accordance with an embodiment is shown. To establish a root of trust, when endpoint device 103 is manufactured, root of trust 160 may be installed in endpoint device 103.

Root of trust 160 may be a public key of a public private key pair controlled by the manufacturer of endpoint device 103. The public private key pair may be established using any process.

To install root of trust 160, root of trust 160 may be stored in endpoint device 103. The storage location and security precautions taken with respect to storing root of trust 160 may vary depending on the architecture of endpoint device 103.

For example, endpoint device 103 may host or include a security manager (e.g., 162). Security manager 162 may be implemented using a discrete hardware component, or may be a software component. Security manager 162 may enforce various security policies on endpoint device 103. For example, the security policies may require that endpoint device 103 validate authority over it back to root of trust 160 before complying with any instructions from other entities that allege to have authority over endpoint device 103.

To validate entities having authority over endpoint device 103, endpoint device 103 may utilize ownership vouchers.

Figure 1D:
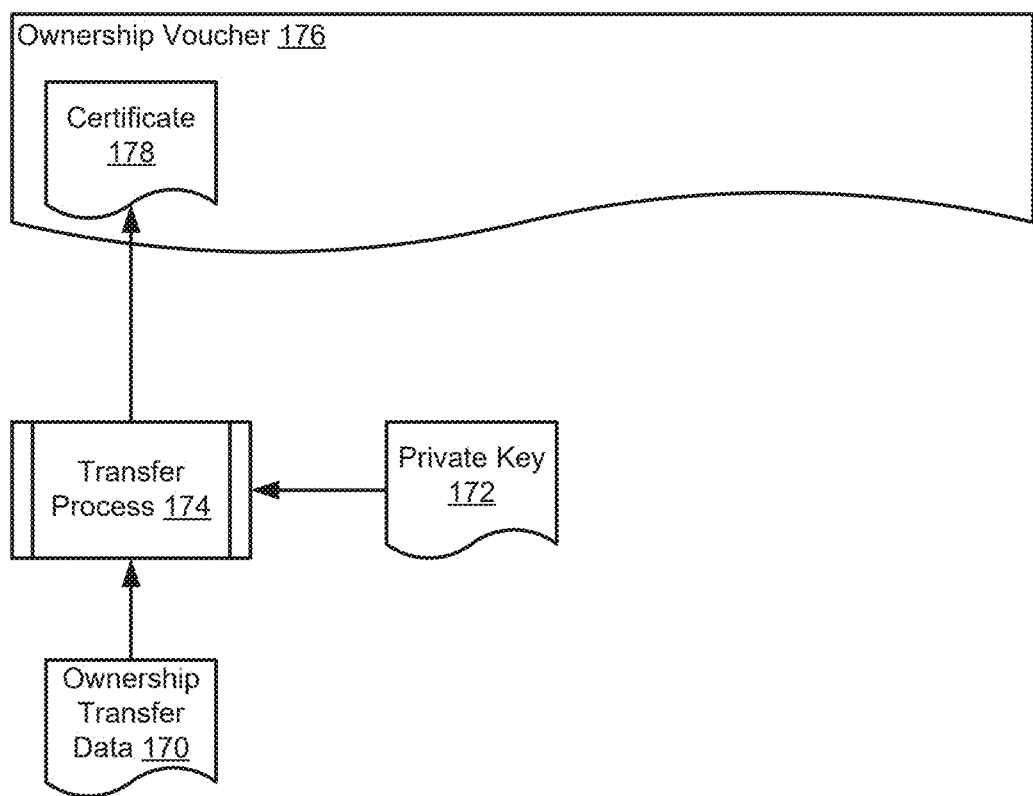
Figure 1E:
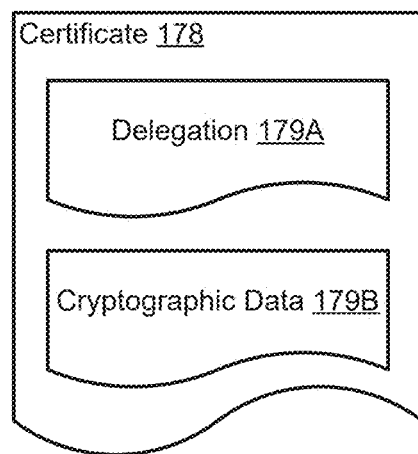

Turning to FIG. 1D, a diagram of an example process for generating ownership voucher 176 in accordance with an embodiment is shown. To generate ownership voucher 176, information regarding changes in ownership and authority over an endpoint device may be added. The information may take the form of a cryptographically verifiable certificate (e.g., 178). Refer to FIG. 1E for additional information regarding certificate 178.

To add a certificate to ownership voucher 176, transfer process 174 may be performed. During transfer process 174, ownership transfer data 170 and private key 172 may be obtained. Ownership transfer data 170 may document a change in ownership and/or authority over an endpoint device. For example, when an endpoint device is sold, a public key of a public private key pair controlled by the purchaser may be added to ownership transfer data 170, along with other types of information regarding the transfer. This public key may be usable to verify signed work orders or other signed data structures from the new owner (e.g., the new owner may be able to use the corresponding private key for signing). The information in ownership transfer data 170 may be treated as a delegation statement, which an endpoint device may parse to identify entities having authority over it.

Figure 1F:
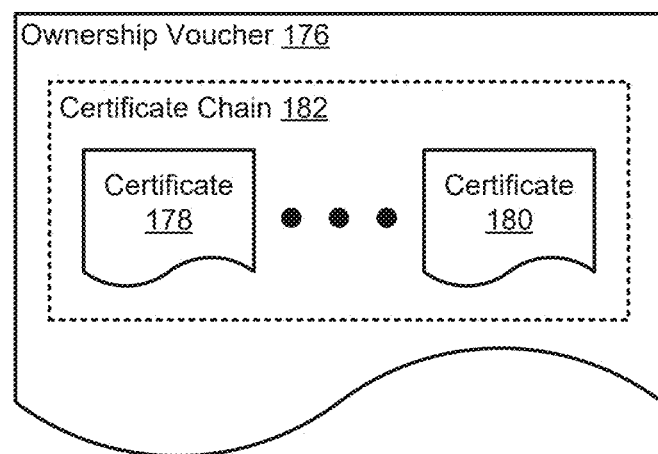
Figure 1G:
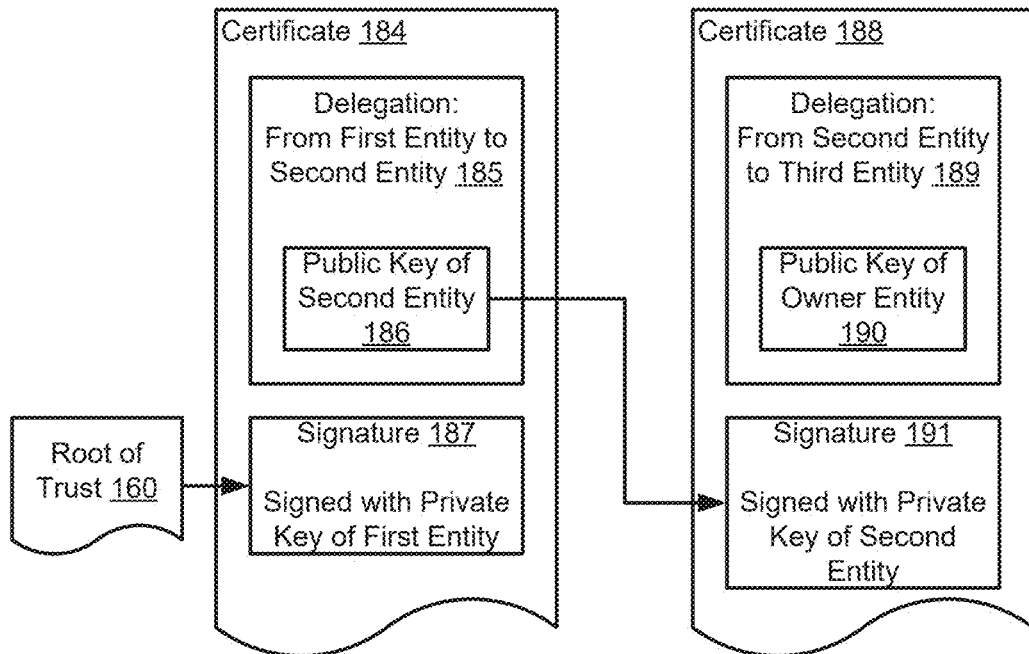
Figure 1H:
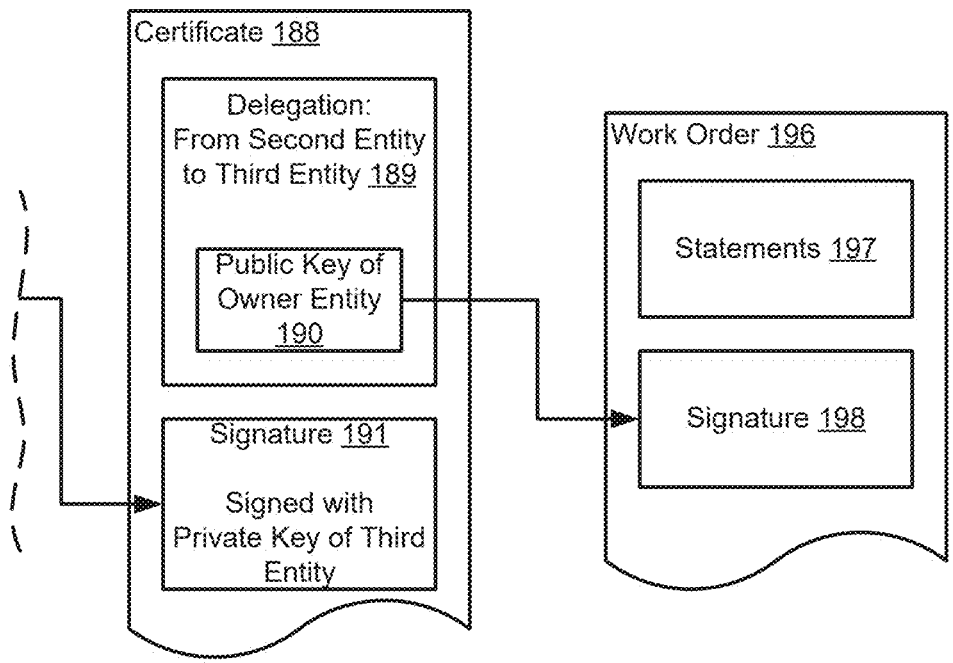

Private key 172 may be a private key of a public private key pair controlled by an entity that has authority over an endpoint device at the time authority over the endpoint device changes (e.g., via sale or other mechanism). In a scenario in which the manufacturer is the seller, the private key corresponding to the root of trust may be private key 172. Similarly, in a scenario in which an intermediate owner is the seller, private key 172 may be the private corresponding to (e.g., referenced by) the public key included in the delegation statement in ownership voucher 176 that establishes the intermediate owner has the owner of the endpoint device. In other words, to establish a delegation of authority, the entity that has authority over the endpoint device as defined by the certificates of ownership voucher 176 may need to sign the ownership transfer data 170 to further delegate ownership and authority over the endpoint device. By doing so, a chain of delegations that are cryptographically verifiable back to the root of trust may be established. Refer to FIGS. 1F-1H for additional details regarding establishing chains of delegations.

Any number of certificates may be added to ownership voucher 176 thereby enabling certificate chains that establish chains of delegation from the root of trust for an endpoint device. Ownership voucher 176 may, as discussed above, be used during onboarding.

Turning to FIG. 1E, a diagram of an example certificate 178 in accordance with an embodiment is shown. Certificate 178 may include delegation 179A and cryptographic data 179B.

Delegation 179A may include information documenting a delegation of authority/ownership over an endpoint device. For example, delegation 179A may include a public key, and indicate what is delegated to the entity that has control over the public private key pair of which the public key is a member. The extent of what is delegated may be specified at a macro level (e.g., ownership) or a micro level (e.g., limited authority).

Cryptographic data 179B may include signature usable to verify the integrity of delegation 179A and ascertain whether delegation 179A is valid.

To determine whether certificate 178 includes a valid delegation, an endpoint device may attempt to establish a chain of delegations back to the root of trust.

Turning to FIG. 1F, a diagram of an example certificate chain 182 of ownership voucher 176 in accordance with an embodiment is shown. Certificate chain 182 may be a series of certificates that can be sequentially validated back to the root of trust. To sequentially validate the certificate back to the root of trust, the first certificate (e.g., 178) in the chain may attempt to be validated using the root of trust (e.g., a public key). Thus, the first certificate in the chain may only be validated if the private key (e.g., controlled by the manufacturer) corresponding to the root of trust was used to sign certificate 178. Other certificates in the chain may be similarly validated by using the public key from the delegation statement of the previous certificate to check the signature in the next certificate in the chain. Certificate chain 182 may include any number of certificates (e.g., 178 through 180) that can be sequentially verified back to the root of trust. Refer to FIGS. 1G-1H for additional information regarding establishing valid certificate chains.

Turning to FIG. 1G, a diagram of an example process for validating a portion of a certificate chain of an ownership voucher in accordance with an embodiment is shown. In FIG. 1G, two certificates (e.g., 184, 188) from a certificate chain are shown.

As seen, certificate 184 may include delegation 185 which includes a public key (e.g., 186) of a second entity. The delegation statement may indicate that a first entity is delegating authority to the second entity.

Certificate 184 may include signature 187. Signature 187 may be generated using a private key controlled by the first entity that delegated authority to the second entity. In this example, the private key may correspond to root of trust 160 (e.g., may be a private corresponding to the public key installed when an endpoint device is manufactured).

To establish a certificate chain, signature 187 may be checked using root of trust 160. If verified as having been signed using the private key corresponding to the root of trust, then certificate 184 may be treated as being valid.

Like certificate 184, certificate 188 may include delegation 189 which includes a public key (e.g., 190) of a third entity, and in this example the owner. The delegation statement of delegation 189 may indicate that the second entity is delegating authority to the third entity (i.e., the owner).

Certificate 188 may include signature 191. Signature 91 may be generated using a private key controlled by the second entity that delegated authority to the third entity. In this example, the private key may correspond to the public key (e.g., 186) of the second entity which may be included in delegation 185.

To extend the certificate chain, signature 191 may be checked using public key of second entity 186. If verified as having been signed using the private key corresponding to public key of second entity 186, then certificate 188 may be treated as being valid.

Once the chain is established, the delegations (e.g., 185, 189) in the chain may be parsed to identify keys to which authority has been delegated from root of trust 160. These public keys may then be used to decide whether various work orders are valid, which entities have authority of an endpoint device, and/or for other purposes.

For example, during onboarding, an endpoint device may evaluate whether to perform various work orders using the keys to which authority has been delegated.

Turning to FIG. 1H, a diagram of an example process for validating a work order in accordance with an embodiment is shown. In FIG. 1H, only a portion of the certificates (e.g., 184, 188) shown in FIG. 1G are shown for clarity.

When a work order (e.g., 196) is received by an endpoint device, the endpoint device may evaluate whether the entity issuing the work order has authority over the endpoint device. To do so, the endpoint device may parse the certificates to identify the public keys to which authority over the endpoint device has been delegated.

The endpoint device may then, using the keys, check a signature (e.g., 198) included in the work order. If the signature can be verified as having been generated using the private key corresponding to one of the public keys to which authority over the endpoint device has been delegated, then the endpoint device may treat work order 196 as having been issued by an entity with authority over it. For example, signature 198 may be checked using public key of owner entity 190, in this example.

The endpoint device may then, for example, process various statements 197 included in work order 196, and take action based on those statements. These statements may include instructions that change the manner of operation of the endpoint device to, for example, comply with security requirements of a new owner, and/or perform other actions.

Figure 1I:

For example, turning to FIG. 1I which shows a diagram in accordance with an embodiment, signed data 204 such as a work order may be validated if public keys included in ownership voucher certificate chains (e.g., 202) correspond to private keys to which the work order issuing entity has access. In this example, ownership voucher certificate chain 202 may be used to establish delegations of authority from root of trust 200 for an endpoint device to the keys used to sign signed data 204.

Figure 1J:
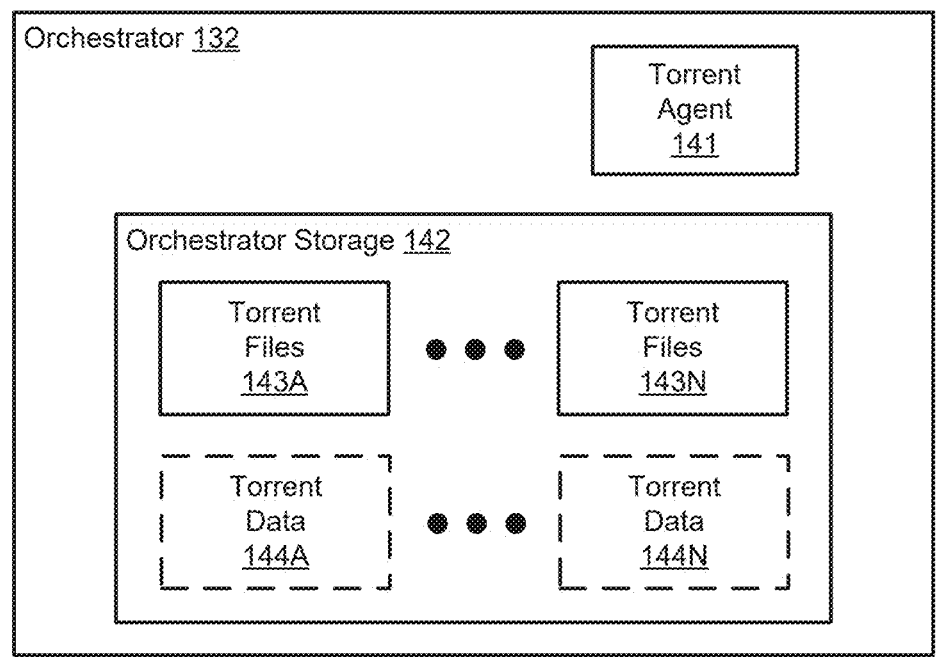

Turning now to FIG. 1J, FIG. 1J shows an example of orchestrator 132 discussed above in FIG. 1A. As shown in FIG. 1J, the orchestrator 132 comprises a torrent agent 141 and an orchestrator storage 142. Each of these components of the orchestrator 132 will be discussed below.

Orchestrator storage 142 may be implemented using any type and combination of storage devices and/or memory (e.g., hard disk drive (HDD), solid state drive (SSD), random access memory (RAM), or the like). Orchestrator storage 142 may be configured to store one or more torrent files 143A-143N and, optionally, one or more torrent data 144A-144N.

In embodiments, each of the torrent files 143A-143N may correspond to a single (or a group) of data (e.g., configuration data) used by the endpoint devices 104A-104N. Namely, each of the torrent files 143A-143N may be a file with a ".torrent" extension. The torrent files 143A-143N may be used by each of the endpoint devices 136A-136N to retrieve data (e.g., in the form of torrent data 144A-144N) using a torrent protocol (e.g., a BitTorrent® protocol). Each of the torrent data 144A-144N may contain all or a portion (e.g., chunk) of the data (e.g., configuration data) to be used by the endpoint devices 136A-136N. For example, a torrent data 144A may contain an entirety (or a chunk) of an OS image to be used by one of the endpoint devices 136A-136N to install and/or update an OS.

In embodiments, torrent agent 141 may be implemented using hardware, software, or a combination of both, and may be configured to keep track of all of the torrent files 143A-143N and a location of each of the torrent data 144A-144N stored across the devices (e.g., the endpoint devices 104A-104N and (optionally) orchestrator 132) of an edge compute environment (e.g., deployment 130 of FIG. 1A). The torrent agent 141 may also be configured to convey information of these data (e.g., the torrent files 143A-143N and torrent data 144A-144N) to any of the endpoint devices 136A-136N. Additionally, the torrent agent 141 may be configured instruct each of the endpoint devices 136A-136N (e.g., via a torrent client of each of the endpoint devices 136A-136N) to download configuration data from other ones of the endpoint devices 136A-136N using the torrent protocol. Further, the torrent agent 141 may also be configured to implement one or more control plane duties of the orchestrator (e.g., causing one or more endpoint devices 136A-136N to apply/use configuration data to obtain updated endpoint devices 136A-136N, or the like). Additional details regarding the operations and capabilities of the torrent agent are discussed below in reference to FIGS. 1J-2E.

While illustrated in FIG. 1J as including a limited number of specific components, example orchestrator 132 of embodiments disclosed herein may include fewer, additional, and/or different components (e.g., hardware components such as a processor, graphics card, power supply, network adaptor, or the like) than those illustrated therein in FIG. 1J.

Figure 1K:
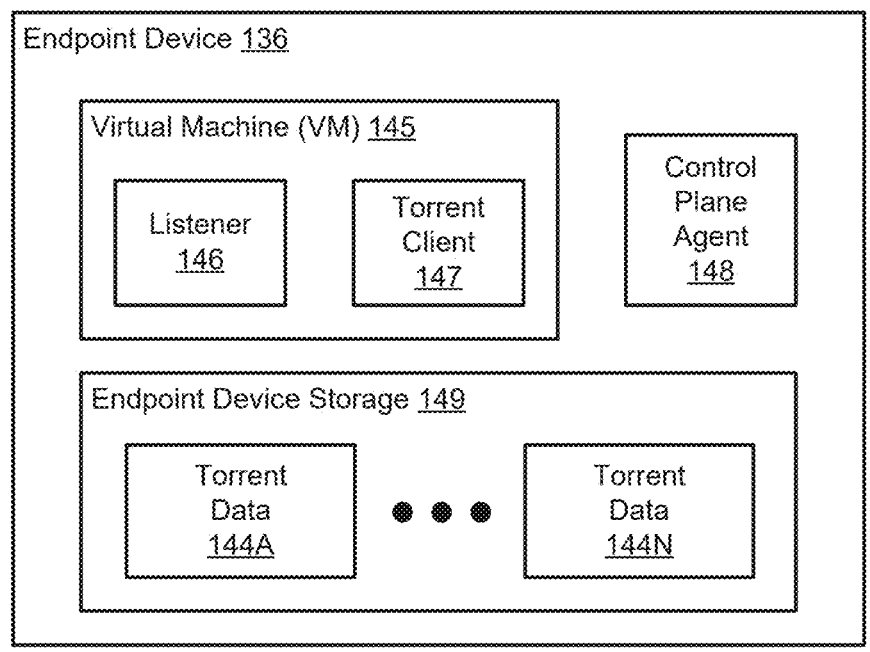

Turning now to FIG. 1K, an example endpoint device 136 is provided. Example endpoint device 136 may be any of the endpoint devices 136A-136N shown in FIG. 1A. As shown in FIG. 1K, example endpoint device 136 may include a virtual machine (VM) 145, a control plane agent 148, and an endpoint device storage 149. Each of these components of the orchestrator 132 will be discussed below.

Endpoint device storage 149 may be implemented using any type and combination of storage devices and/or memory (e.g., hard disk drive (HDD), solid state drive (SSD), random access memory (RAM), or the like). Endpoint device storage 149 may be configured to store one or more torrent data 144A-144N, which are discussed above in reference to FIG. 1J.

Virtual machine (VM) 145 may be a virtual computing device and/or system hosted on the example endpoint device 136 (namely, hosted on the hardware resources of the endpoint device 136A). VM 145 may host an operating system (not shown) (similar to or different from an operating system of the example endpoint device 136) and one or more applications (e.g., listener 146 and torrent client 147). VM 145 may be configured to implement a sandboxed virtual network segment of embodiments disclosed herein, as discussed in more detail below in reference to FIG. 1L.

Listener 146 of VM 145 may be configured to receive instructions from the orchestrator 132 (namely, from torrent agent 141 of the orchestrator 132) and to notify the orchestrator 132 or one or more operations being executed by or that has been completed by other applications the VM 145 (including torrent client 147). Listener 146 may also be configured to implement one or more other operations (e.g., security-based operations) discussed below in reference to FIGS. 1J-2E.

Torrent client 147 may be configured to implement a torrent protocol for downloading one or more torrent data 144A-144N from other ones of the endpoint devices 136A-136N within the edge compute environment (e.g., deployment 130 of FIG. 1A). Torrent client 147 may also be configured to implement one or more other operations discussed below in reference to FIGS. 1J-2E.

In embodiments, the listener 146 and the torrent client 147 may be combined into a single application that is able to implement all of the above-discussed operations of the listener 146 and the torrent client 147.

Control plane agent 148 may be configured using hardware, software, or a combination of both. Control plane agent 148 may be configured to be the point of communication between the example endpoint device 136 and the control plane (e.g., the orchestrator 132) of the edge compute environment. For example, control plane agent 148 may receive instructions from the control plane of the edge compute environment to cause the example endpoint device 136 to implement one or more processes (e.g., provide one or more computer-implemented services, use/execute one or more configuration data, or the like). Control plane agent 148 may also be configured to implement one or more other operations (e.g., security-based operations) discussed below in reference to FIGS. 1J-2E. In embodiments, the control plane agent 148 may be isolated from (e.g., prevented from being able to communicate with) the listener 146 and the torrent client 147 of VM 145).

While illustrated in FIG. 1K as including a limited number of specific components, example endpoint device 136 of embodiments disclosed herein may include fewer, additional, and/or different components (e.g., hardware components such as a processor, graphics card, power supply, network adaptor, or the like; additional VMs; additional applications; or the like) than those illustrated therein in FIG. 1K.

Figure 1L:
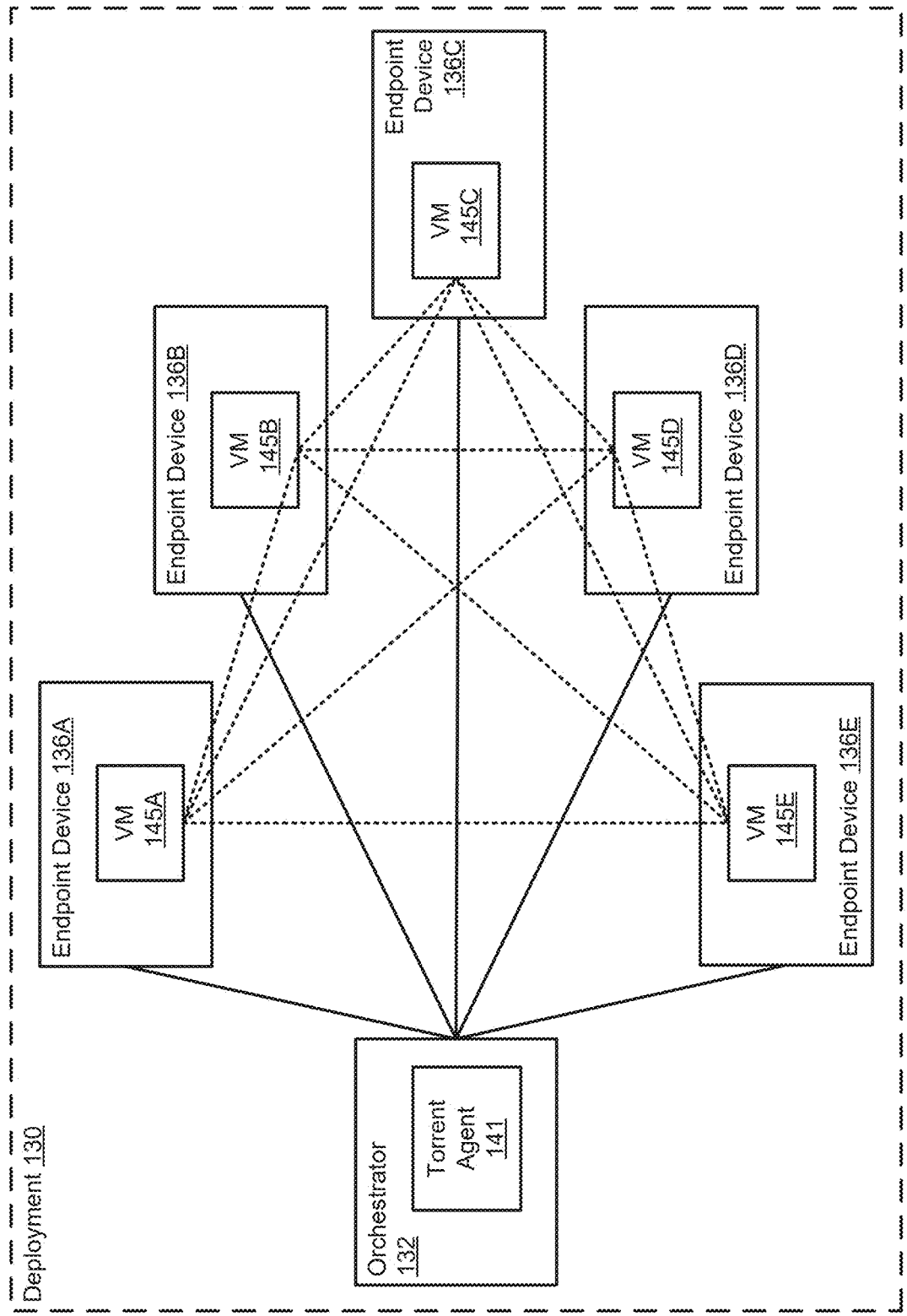

Turning now to FIG. 1L, FIG. 1L shows an example sandboxed virtual network segment (for implementing a torrent protocol using the endpoint devices 136A-136N) of embodiments disclosed herein.

In particular, FIG. 1L shows an example deployment 130 (e.g., an example edge compute environment) having an orchestrator 132 and five (5) endpoint devices (e.g., endpoint devices 136A-136E). As shown in FIG. 1L, each endpoint device 136A-136E may have a physical layer connection (also referred to herein as a "physical network") (e.g., via a wired or wireless LAN set up within deployment 130) to the orchestrator 132. Each of these physical layer connections (shown using the solid lines connecting each of the endpoint devices 136A-136E to the orchestrator 132) may be associated with one or more physical internet protocol (IP) addresses and/or physical media access control (MAC) addresses. This physical layer connection may also form the control plane and application communication layers between the endpoint devices 136A-136E and the orchestrator 132.

Within deployment 130, the endpoint devices 136A-136E may also be connected to one another via a Virtual extensible Local-Area Network (VXLAN) set up through the respective VMs (e.g., 145A-145E) of each of the endpoint devices 136A-136E. This VXLAN may be overlaid on top of the physical layer connection between the endpoint devices 136A-136E and the orchestrator 132, and may connects the VMs (e.g., 145A-145E) of each of the endpoint devices 136A-136E to one another. Each of these VXLAN connections (shown using the dotted lines connecting each of the VMs (e.g., 145A-145E) of each of the endpoint devices 136A-136E) may be associated with one or more virtual internet protocol (IP) addresses and/or virtual media access control (MAC) addresses.

In embodiments, the VXLAN may advantageously form an isolated virtual network topology over the top of a constrained edge-to-server connectivity (made up by the physical network between the endpoint devices 136A-136N and the orchestrator 132). A torrent-based peer-to-peer file sharing protocol that is not subject to any of the constraints associated with the physical network constraints may also be implemented within this VXLAN (e.g., the sandboxed virtual network segment formed between the VMs (e.g., 145A-145E) of the endpoint devices 136A-136E). Such torrent-based peer-to-peer file sharing protocol may advantageously be safely isolated from any native operating environment and connectivity between the endpoint devices 136A-136E and the orchestrator 132.

In embodiments, such a sandboxed virtual network segment may provide the endpoint devices 136A-136E with an ecosystem to share torrent data (e.g., torrent data 144A-144N of FIGS. 1J and 1K) between the endpoint devices 136A-136E without being affected by constraints (e.g., firewall policies, other security policies, or the like) of the deployment 130 that are imposed onto the endpoint devices 136A-136E where such constraints may conventionally now allow sharing of data via the torrent protocol between the endpoint devices 136A-136E using the physical network of the deployment 130.

In particular, due to edge constraints, strict connectivity policies are typically followed in edge compute environments. Such constraints include limited control-plane connectivity for edge devices, firewall rules that block native inbound connections to the devices, and other zero-trust connectivity constraints. As a result, without the sandboxed virtual network segment of embodiments disclosed herein, torrent activity between the endpoint devices 136A-136E is usually blocked and not available to the endpoint devices 136A-136E.

To further clarify embodiments disclosed herein, data flow diagrams in accordance with one or more embodiments are shown in FIGS. 2A-2E. In these diagrams, flows of data and processing of data are illustrated using different sets of shapes. A first set of shapes (e.g., 212, 216, etc.) is used to represent data structures (e.g., files, packaged data, or the like), a second set of shapes (e.g., 210, 214, 218, etc.) is used to represent processes performed using and/or that generate data, and a third set of shapes (e.g., 132, 141, etc.) is used to represent components (e.g., the components discussed in FIG. 1A, 1J, 1K, or the like).

Turning to FIGS. 2A-2E, data flow diagrams in accordance with one or more embodiments are shown. The data flow diagrams may illustrate part of a process of one or more embodiments for managing an edge compute environment comprising endpoint devices and an orchestrator using an internal peer-to-peer file sharing infrastructure exclusive to the edge compute environment.

Figure 2A:
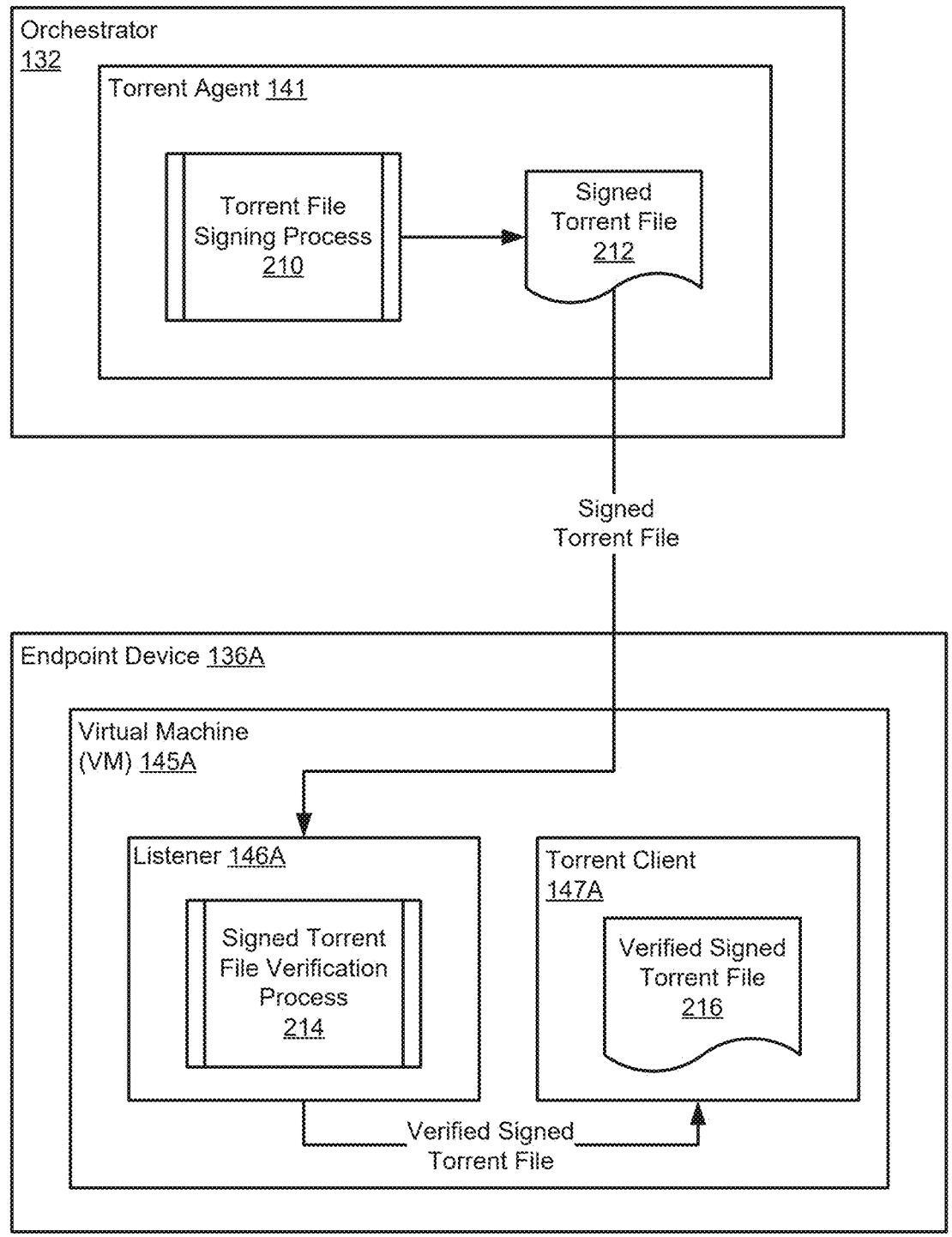
FIGS. 2A-2E show data flow diagrams in accordance with one or more embodiments disclosed herein.

Starting with FIG. 2A, initially, an orchestrator 132 may determine that an endpoint device (e.g., 136A) within the edge compute environment needs one or more configuration data (e.g., for onboarding purposes, for updating purposes, or like). Assume, for the example data flow discussed in FIGS. 2A-2E, that the endpoint device 136A is due for an OS update and needs an OS update file.

Based on this determination, the orchestrator 132 may initiate torrent file signing process 210. As part of torrent file signing process 210, the orchestrator 132 may first determine (e.g., using torrent agent 141) that a torrent file (e.g., torrent file 143A-143N of FIG. 1J) torrent data (e.g., torrent data 144A-144N in FIGS. 1J-1K) associated with the OS update exists (e.g., within the orchestrator storage 142 and endpoint devices storages 149, respectively). Said another way, torrent agent 141 determines that orchestrator 132 has a "torrent" file for the OS update and chunks of the OS update (stored as torrent data associated with the ".torrent" file is available among the endpoint devices of the deployment.

The orchestrator 132 may then, also as part of torrent file signing process 210, create a work order (e.g., work order 196 of FIG. 1H) that is signed using a private key held by the orchestrator 132 (e.g., as signature 198 of the work order). This work order may be signed torrent file 212 shown in FIG. 2A. The orchestrator 132 may also include (as statements 197 of the work order): (i) the "torrent" file of the OS update; (ii) instructions for an endpoint device (e.g., 136A) receiving the work order to download the OS update using the "torrent" file; (iii) a list of seeds (e.g., endpoint devices 136A-136N) storing chunk(s) of the OS update; (iv) metadata of the OS update; and (v) one or more security protocols for verifying the chunk(s) (e.g., a checksum, hash, or the like of each chunk(s)).

In embodiments, the "torrent" file of the OS update itself may be the work order, and the ".torrent" file of the OS update may include: (i) the signature signed using the private key held by the orchestrator 132; (ii) instructions for an endpoint device (e.g., 136A) receiving the work order to download the OS update using the "torrent" file; (iii) a list of seeds (e.g., endpoint devices 136A-136N) storing chunk(s) of the OS update; (iv) metadata of the OS update; and (v) one or more security protocols for verifying the chunk(s) (e.g., a checksum, hash, or the like of each chunk(s)).

As shown in FIG. 2A, the torrent agent 141 may provide the signed torrent file 212 to the virtual machine (VM) 145A of endpoint device 136A (namely, to listener 146A of the VM 145A (e.g., 146 and 145, respectively, of FIG. 1K)). Upon receiving the signed torrent file 212, listener 146A may be configured to instantiate (e.g., initiate) a signed torrent file verification process 214.

More specifically, the torrent agent 141 may provide the signed torrent file 212 to VM 145A of endpoint device 136A via a reverse torrent protocol. In embodiments, the reverse torrent protocol may include a centrally orchestrated distributed file download mechanism where the a torrent client (here torrent client 147A of endpoint device 136A) is directed by a trusted entity (here, orchestrator 132) to begin retrieving the torrent data chunks associated with the torrent file from one or more trusted sources (here, the other endpoint devices) instead of the torrent client independently searching for file sources containing the torrent data chunks.

In embodiments, as part of signed torrent file verification process 214, the listener 146A may use a public key included in an ownership voucher (e.g., 176 of FIG. 1D) of the endpoint device 136A to verify the signature included in the signed torrent file 212. The public key may be part of a public-private key pair of the private key used by the orchestrator 132 to sign the signed torrent file 212. As a result, the endpoint device 136A (via listener 146A) may be able to verify an authenticity of the signed torrent file (e.g., as a trusted file) back to a root of trust (e.g., as described in root of trust authentication/verification process discussed in FIGS. 1B-1I).

In embodiments, the public key of the endpoint device 136A may be provisioned to the endpoint device 136A within the ownership voucher of the endpoint device 136A prior to or as the endpoint device 136A is being onboarded into deployment 130. Alternatively, the public key may be separately provided (e.g., as a separate and individual component) by the orchestrator 132 to the endpoint device 136A after the endpoint device 136A is onboarded onto deployment 130. Upon receiving the public key, the endpoint device 136A may stored the public key is a secured partition within the endpoint device 136A (e.g., within a secured portion of endpoint device storage 149A of endpoint device 136A, or the like).

Other cryptographic or non-cryptographic security method/protocol may be used instead of the public-private key pair to create and verify a trusted torrent file without departing from the scope of embodiments disclosed herein.

Once the signed torrent file 212 has been verified by listener 146A (e.g., using signed torrent file verification process 214), the work order and/or torrent file (e.g., initially signed torrent file 212 and now verified signed torrent file 216) may be provided to the torrent client 147A (e.g., by listener 146A) of the endpoint device 136A.

Figure 2B:
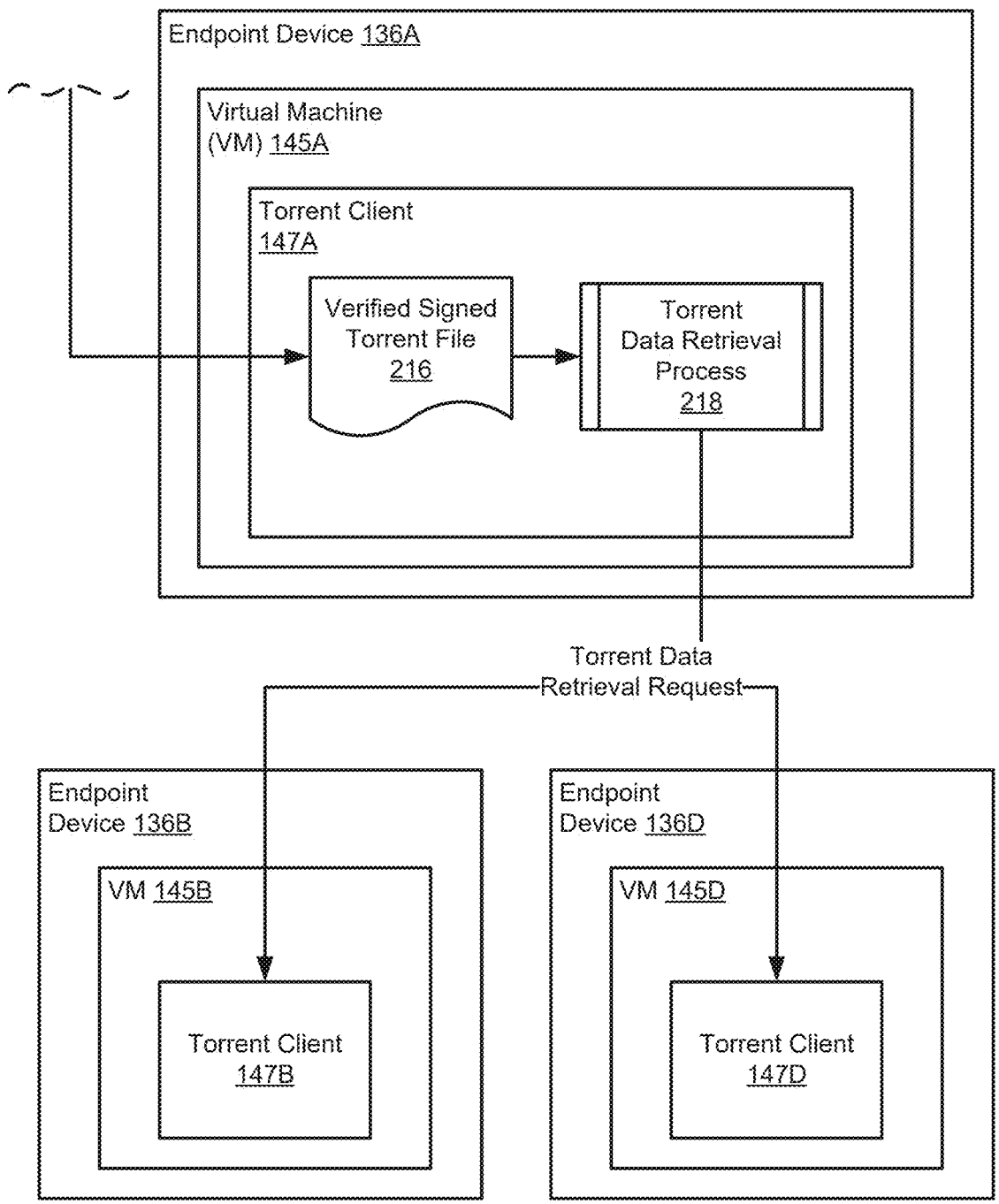

Turning now to FIG. 2B, torrent client 147A may provide verified signed torrent file 216 to (e.g., use verified signed torrent file 216 in) torrent data retrieval process 218. As part of torrent data retrieval process 218, torrent client 147A of endpoint device 136A may use the list of seeds (e.g., endpoint devices 136A-136N) included in the verified signed torrent file 216 to determine which endpoint devices within the deployment 130 (including endpoint device 136A itself) is storing the chunk(s) associated with the ".torrent" file of the OS update. The torrent data retrieval process 218 may also use this list of seeds to transmit torrent data retrieval request(s) to each of the seeds included on the list.

Figure 2C:
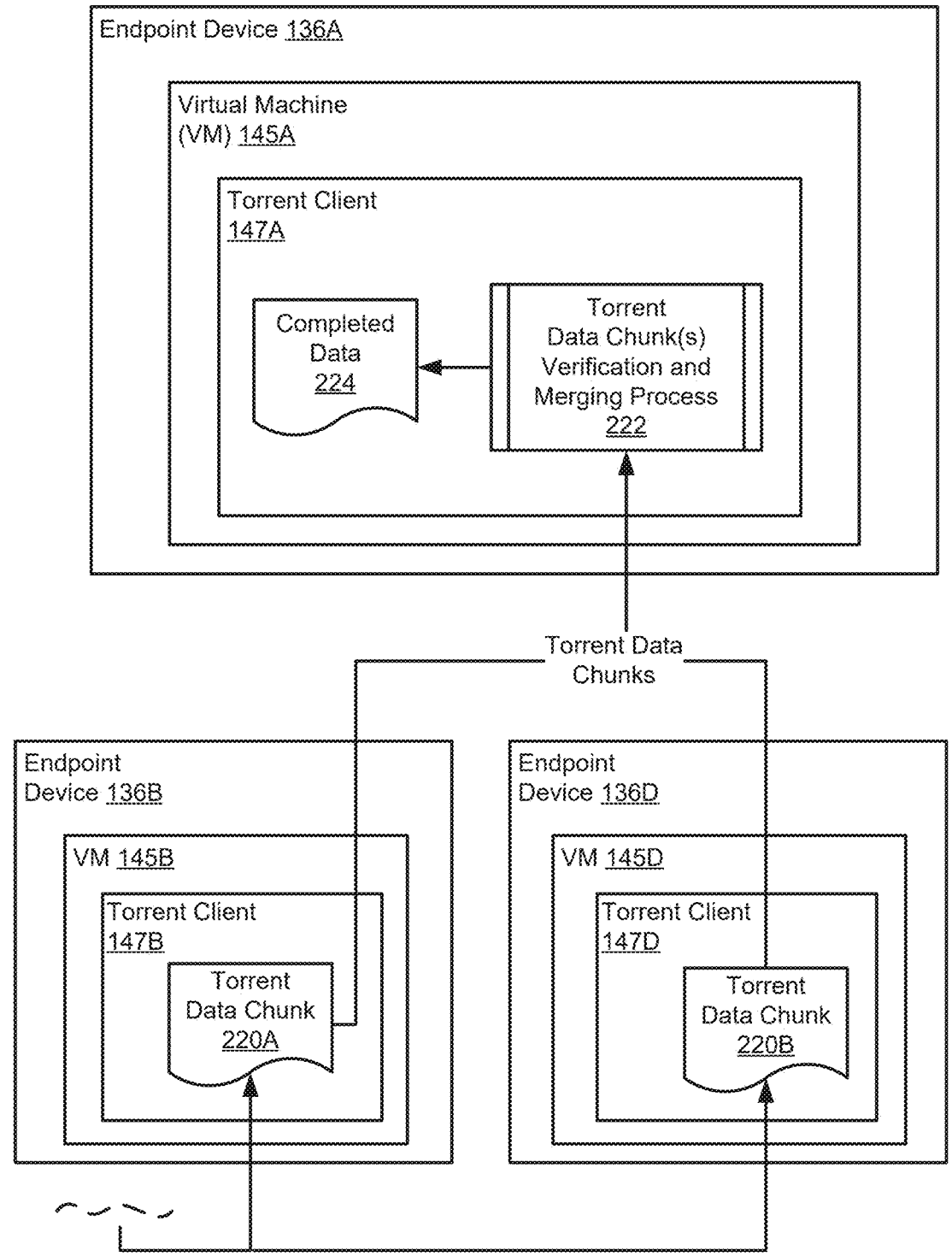

In particular, as shown in the example discussed in FIG. 2B, the torrent client 147A of endpoint device 136A determines (using the list of seeds) that endpoint devices 136B and 136D are the seeds storing the chunk(s) of the ".torrent" file of the OS update. Thus, torrent client 147A transmits (e.g., via the sandboxed virtual network segment established between the respective VMs of the endpoint devices (including endpoint devices 136A, 136B, and 136D)) a torrent data retrieval request to torrent client 147B of endpoint device 136B and another torrent data retrieval request to torrent client 147D of endpoint device 136D. The chunk(s) of the ".torrent" file of the OS update will then be retrieved (e.g., download) from endpoint device 136B and endpoint device 136D using the torrent protocol. Namely, as shown in FIG. 2C, upon receiving the respective torrent data retrieval requests from torrent client 147A of endpoint device 136A, the torrent client 147B of endpoint device 136B and the torrent client 147D of endpoint device 136D are configured to establish connections with torrent client 147A of endpoint device 136A (via the sandboxed virtual network segment) to allow the torrent client 147A of endpoint device 136A to retrieve (e.g., download) the torrent chunk(s) (e.g., torrent data chunk 220A and torrent data chunk 220B shown in FIG. 2C) of the OS update from endpoint devices 136B and 136D. Said another way, torrent client 147A of endpoint device 136A connects to the seeds (e.g., other endpoint devices within the sandboxed virtual network segment that have the chunks) to download the chunks of the ".torrent" file of the OS update.

Upon downloading the chunks (e.g., torrent data chunk 220A and torrent data chunk 220B) from endpoint devices 136B and 136D, torrent client 147A instantiates torrent data chunk(s) verification and merging process 222 to authenticate (e.g., verify an authenticity of) the chunks and merge the chunks into completed data 224 (i.e., the completed OS update file in this example).

In particular, as part of torrent data chunk(s) verification and merging process 222, torrent client 147A authenticates, validates, verifies, or the like each chunk separately (e.g., using the one or more security protocols for verifying the chunk(s) included in the verified signed torrent file 216. For example, assume that the one or more security protocol is a hash protocol, the verified signed torrent file 216 will include a hash of each chunk to be retrieved. Each of the retrieved chunks (e.g., torrent data chunk 220A and torrent data chunk 220B) will be hashed and the resulting hashes will be compared to the hashes included in the verified signed torrent file 216.

Only after each retrieved chunk is successfully authenticated that the retrieved chunks are merged together to form completed data 224. Should any chunks fail the authentication, one or more remedial processes may be executed by the torrent client 147A to request further assistance and/or instructions from torrent agent 141. Any type of remedial processes that could resolve the error may be executed without departing from the scope of embodiments disclosed herein.

Figure 2D:
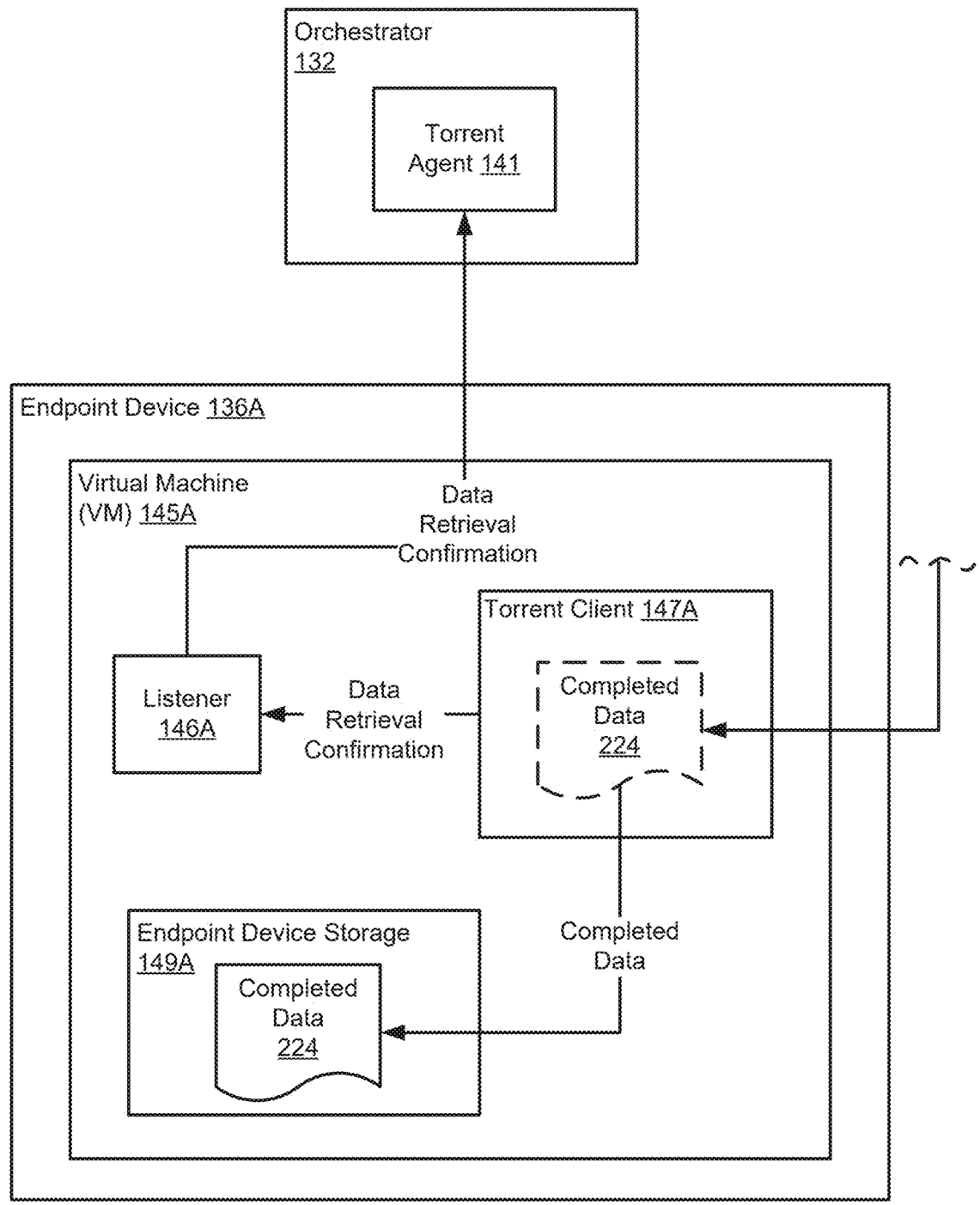

Turning now to FIG. 2D, upon obtaining the completed data 224 after completing the torrent data chunk(s) verification and merging process 222, torrent client 147A may move (e.g., store) the completed data 224 to a secured partition within endpoint device 136A. As shown in the example of FIG. 2D, the secured partition may be within the endpoint device storage 149A of endpoint device 136A (e.g., a portion within the endpoint device storage 149A with a higher level of security as compared to other portions within the endpoint device storage 149A).

Once the completed data 224 is stored into the secured partition within endpoint device 136A, the torrent client 147A notifies (e.g., via providing a data retrieval confirmation, or the like) listener 146A that the OS update file has been successfully retrieved and stored. This notification (e.g., data retrieval confirmation shown in FIG. 2D) may include a location (e.g., path) of the secured partition where the completed data 224 is stored.

Upon receiving the data retrieval confirmation, the listener 146A may (as shown in FIG. 2D) notify (e.g., by forwarding the data retrieval confirmation, generating a new confirmation notification, or the like) the torrent agent 141 (of orchestrator 132) of the successful retrieval and storage of the completed data 224 (e.g., the OS update file). The notification provided by the listener 146A to the torrent agent 141 may also include information indicating the location (e.g., path) of the secured partition where the completed data 224 is stored.

Figure 2E:
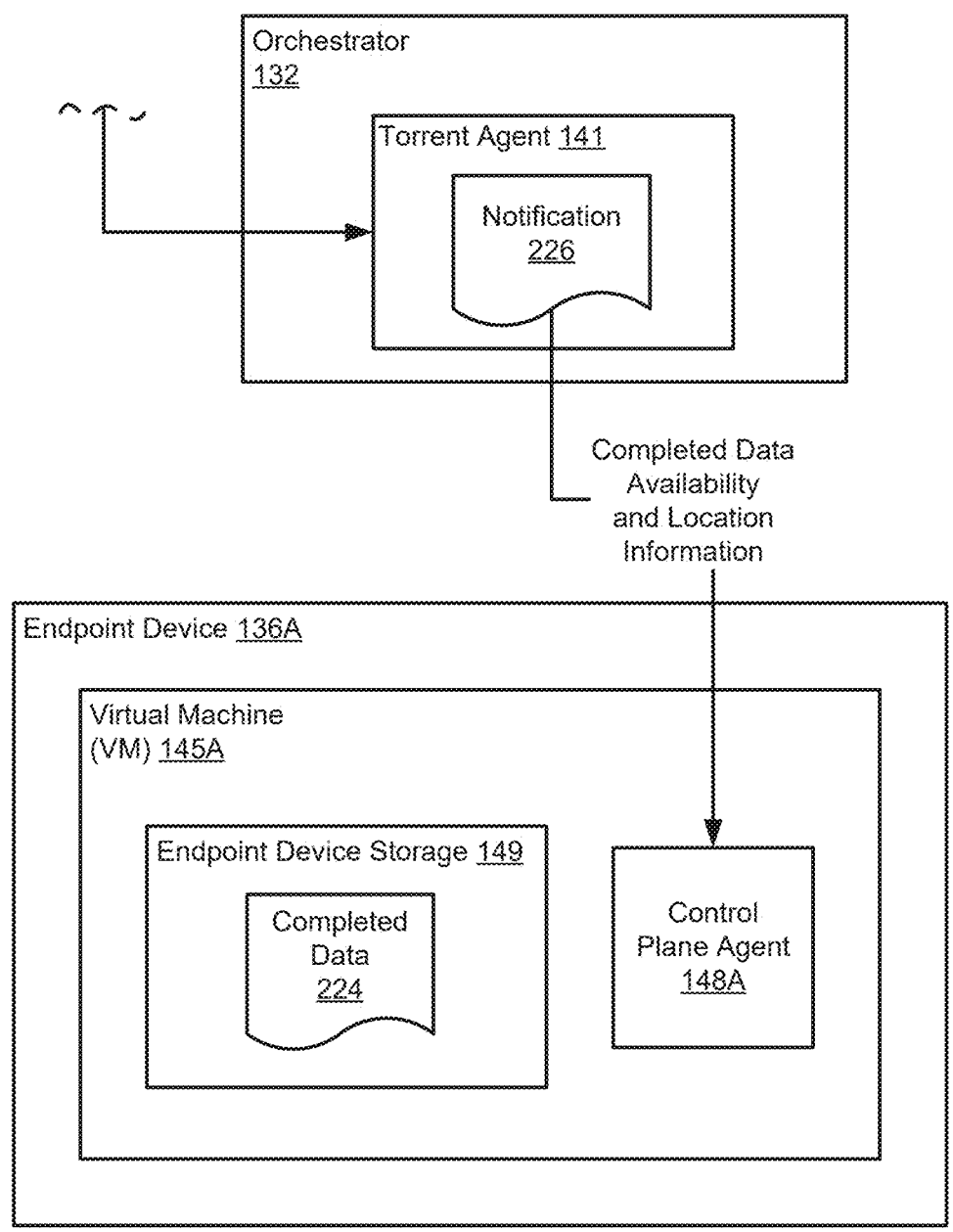

Subsequently, in FIG. 2E, the torrent agent 141 generates and transmits a notification 226 to the control plane agent 148A (e.g., via the physical network connecting the endpoint device 136A to orchestrator 132 discussed in FIG. 1L) of endpoint device 136A. The notification 226 may include a completed data availability and location information indicating that: (i) the OS update file has been successfully downloaded by the torrent client 147A endpoint device 136A; and (ii) the location (e.g., path) of the secured partition within endpoint device 136A where the completed data 224 is stored).

Control plane agent 148A may then use this completed data availability and location information included in notification 226 to cause the endpoint device 136A to execute the OS update file to complete an OS update of the endpoint device 136A (e.g., to obtain an updated endpoint device 136A.

As a result, embodiments disclosed herein provide, using the internal peer-to-peer file sharing infrastructure exclusive to the edge compute environment established using the endpoint devices and the orchestrator, an improved and more secured method and system for distributing configuration data between the endpoint devices of an edge compute environment.

Additionally, the example discussed in FIGS. 2A-2E show a deployment that already has (e.g., is already storing) the torrent data for the OS update file used in this example. Prior to this OS update file being available (as torrent data), the orchestrator 132 may first obtain (e.g., from an administrator, from a source external to the edge compute network, from one of the existing endpoint devices, or the like) the OS update file. Once the orchestrator 132 has this update file, the torrent agent 141 of the orchestrator may implement one or more torrent protocol processes to separate this OS update file into the individual chunks, apply the one or more security protocols (e.g., the checksums, hashes, or the like) to these chunks, and distribute these chunks (e.g., via one or more other signed work orders) to one or more of the endpoint devices. The one or more endpoint devices that receive the signed work orders may verify the signed work orders for authenticity (e.g., using the method/process as discussed in FIGS. 1B-1I) and then stored the chunk(s) in their respective endpoint device storages. Thus, this OS update file may now be available for any of the endpoint devices within the edge compute device to download and use via the torrent protocol implemented (e.g., executed) over the sandboxed virtual network segment connecting the endpoint devices.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
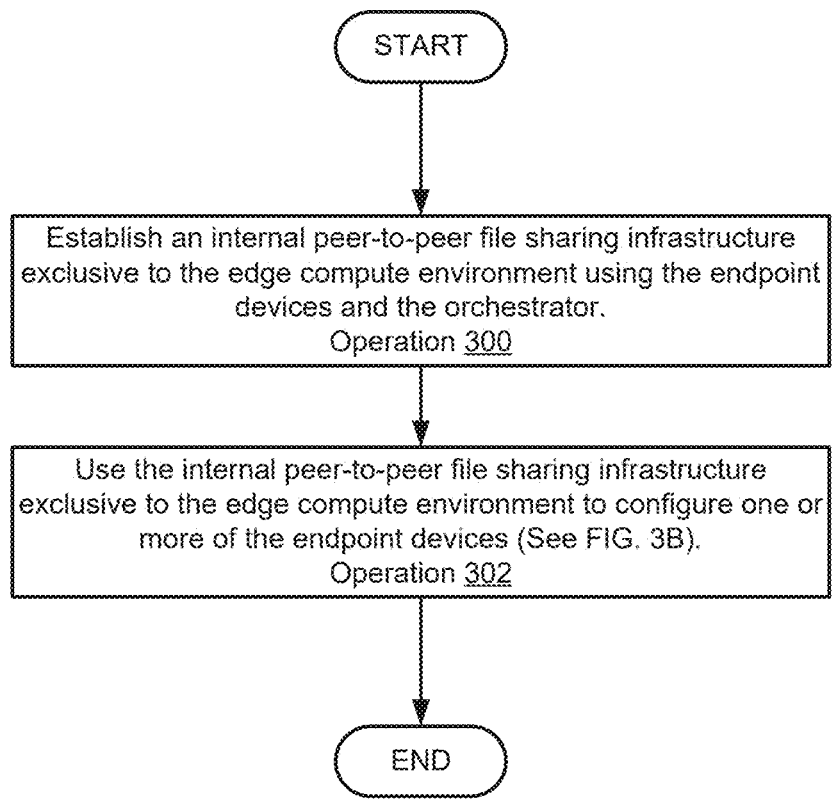
FIGS. 3A-3C show flows diagram illustrating a method in accordance with one or more embodiments disclosed herein.
Figure 3B:
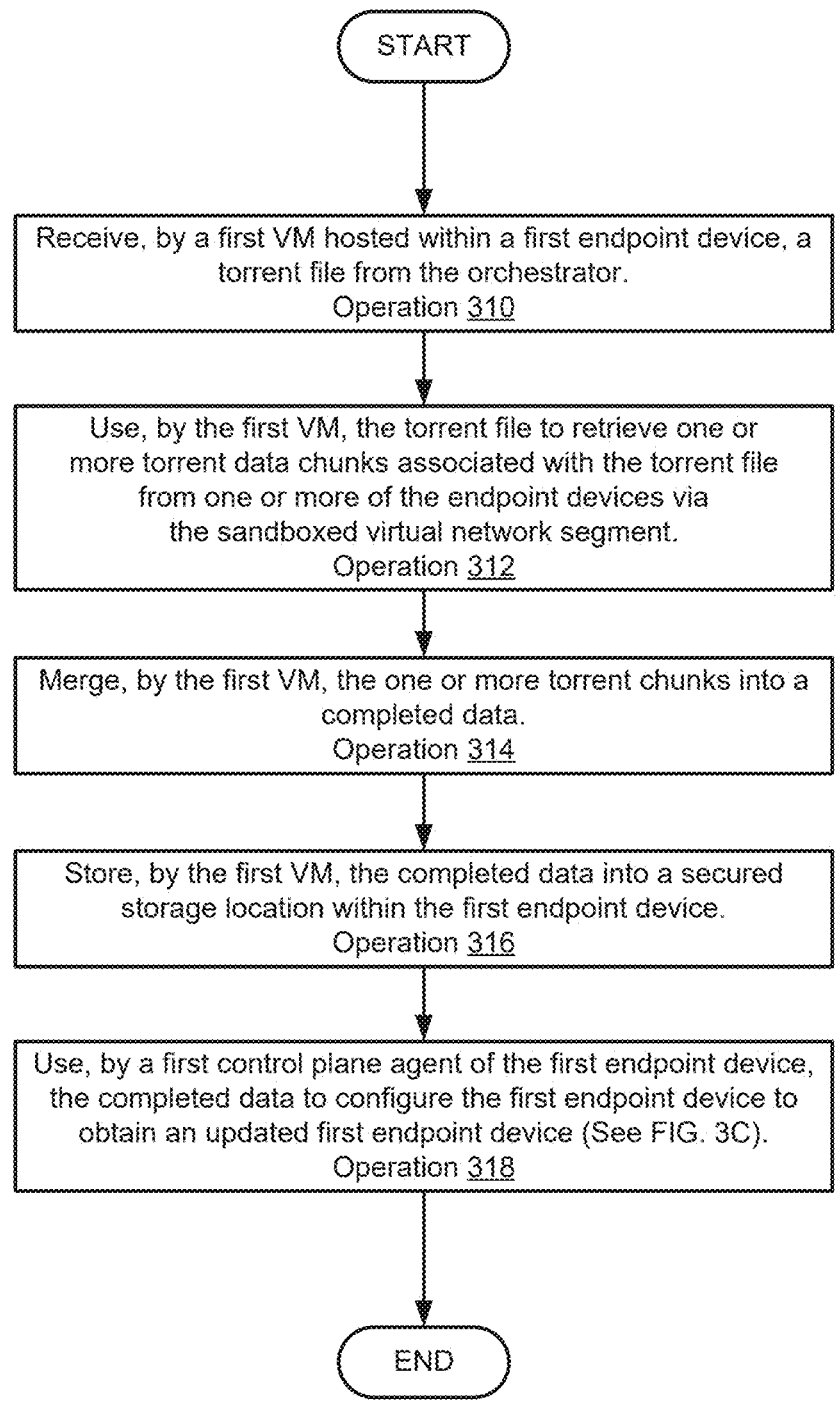
Figure 3C:
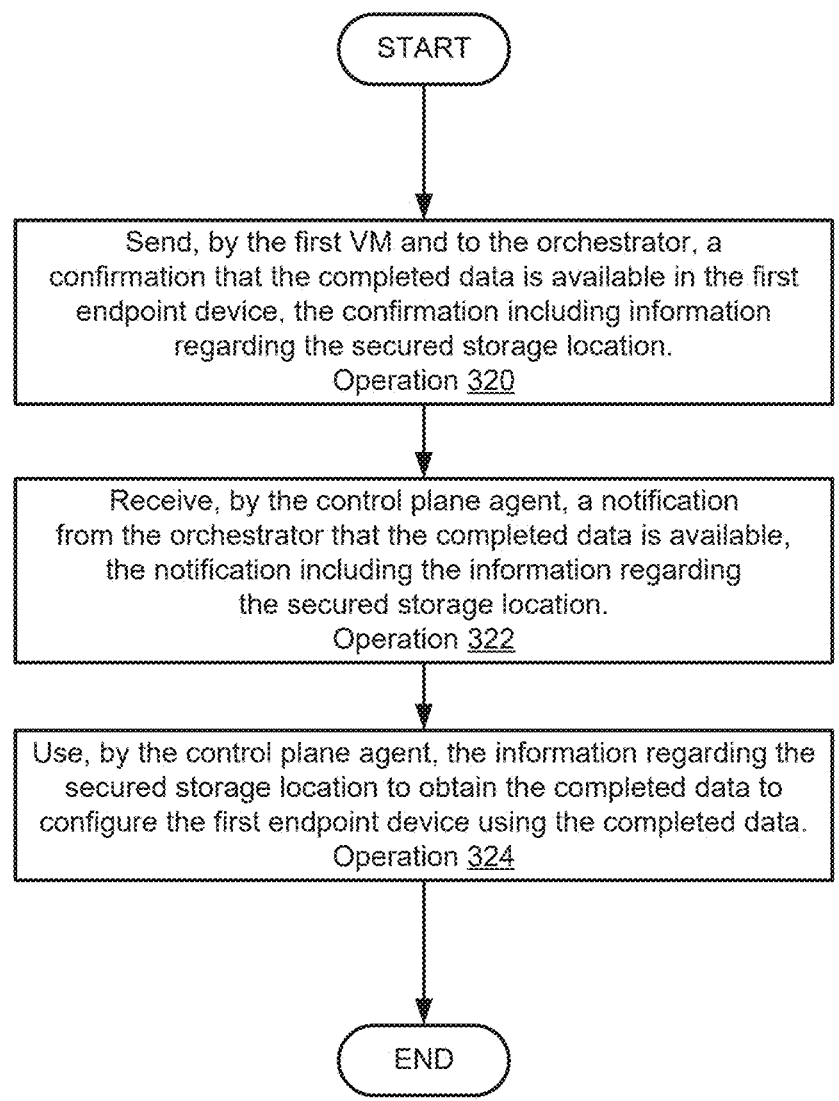

Turning now to FIGS. 3A-3C, flow diagrams illustrating methods for managing an edge compute environment comprising endpoint devices and an orchestrator are shown. The methods may be performed, for example, by any of the components of the system of FIGS. 1A-1L, and/or other components not shown therein.

Starting with FIG. 3A, at operation 300, as discussed above in reference to FIGS. 1A-2E, an internal peer-to-peer file sharing infrastructure exclusive to an edge compute environment (e.g., deployment 130 of FIG. 1A) may be established using endpoint devices (e.g., endpoint devices 104A-104N of FIG. 1A) and an orchestrator (e.g., orchestrator 132 of FIG. 1A) that make up the edge compute environment.

In embodiments, and as discussed above in reference to FIGS. 1A-2E, the internal peer-to-peer file sharing infrastructure may use a torrent protocol and a sandboxed virtual network segment (e.g., FIG. 1L) that connects the endpoint devices to one another. The internal peer-to-peer file sharing infrastructure is exclusive to (e.g., only available to) the devices making up the edge compute environment (e.g., not available/accessible to devices external to the edge compute environment).

At operation 302, as discussed above in reference to FIGS. 2A-2E, the internal peer-to-peer file sharing infrastructure exclusive to the edge compute environment may be used to configure one or more of the endpoint devices to allow the endpoint devices to provide one or more (new or updated) computer-implemented services to one or more users associated with the edge compute environment. Processes making up this operation will be discussed in more detail below in reference to FIGS. 3B and 3C, discussed in more detail below.

The process of FIG. 3A may end following operation 302.

Turning now to FIG. 3B, FIG. 3B shows a flow diagram illustrating operations executed by a virtual machine (VM) (e.g., VM 145 shown in FIG. 1K) of an endpoint device to retrieve data (e.g., configuration data or the like) for configuration of the endpoint device.

In operation 310, as discussed above in reference to FIG. 2A, a first VM (e.g., 145A, FIG. 2A) hosted within a first endpoint device (e.g., 136A FIG. 2A) may receive a torrent file (e.g., singed torrent file 212, FIG. 2A) from an orchestrator (e.g., 132, FIG. 2A).

In embodiments, the torrent file may be included in a signed work order generated by the orchestrator. Alternatively, the signed torrent file itself may be the work order.

The signed work order may include: (i) a ".torrent" file associated with configuration data to be used by the endpoint device; (ii) instructions for the endpoint device receiving the work order to download the configuration data using the "torrent" file; (iii) a list of seeds (e.g., endpoint devices of the edge compute environment) storing chunk(s) of the configuration data; (iv) metadata of the configuration data; and (v) one or more security protocols for verifying the chunk(s) (e.g., a checksum, hash, or the like of each chunk (s)).

In embodiments, the signed torrent file (as the work order itself) may include: (i) a signature signed using the private key (or other similar cryptographical protocol) of the orchestrator 2; (ii) instructions for an endpoint device receiving the signed torrent file to download the configuration data using the signed torrent file; (iii) the list of seeds (e.g., endpoint devices) storing chunk(s) of the configuration data; (iv) metadata of the configuration data; and (v) one or more security protocols for verifying the chunk(s) (e.g., a checksum, hash, or the like of each chunk(s)).

At operation 312, as discussed above in reference to FIGS. 2A-2C, the first VM may use the torrent file to retrieve (e.g., using torrent data retrieval process 218 of FIG. 2B) one or more torrent data chunks associated with the torrent file from one or more of the endpoint devices via the sandboxed virtual network segment.

At operation 314, as discussed above in reference to FIG. 2C, the first VM may verify and merge (e.g., using torrent data chunk(s) verification and merging process 222 of FIG. 2C) the one or more torrent chunks into a completed data (e.g., 224, FIG. 2C).

At operation 316, as discussed above in reference to FIG. 2D, the first VM may store the completed data into a secured storage location (e.g., a secured partition) within the first endpoint device. In embodiments, the first VM may also notify the orchestrator that the configuration data is available and securely stored in the first endpoint device.

At operation 318, as discussed above in reference to FIGS. 2D-2E, a first control plane agent of the first endpoint device may use the completed data to configure the endpoint device to obtain an updated first endpoint device (as discussed in more detail below in FIG. 3C).

The process of FIG. 3B may end following operation 318.

Turning now to FIG. 3B, FIG. 3B shows a flow diagram illustrating operations executed by a virtual machine (VM) (e.g., VM 145 shown in FIG. 1K) and a control plane agent (e.g., 148 of FIG. 1K) of an endpoint device to use the completed data to configure the endpoint device to obtain an updated first endpoint device.

At operation 320, as discussed above in reference to FIG. 2D, the first VM may send to the orchestrator a confirmation that the completed data is available in the first endpoint device. In embodiments, the confirmation may include information regarding the secured storage location. In embodiments, the first control plane agent and the secured storage location may not be hosted within the first VM.

At operation 322, as discussed above in reference to FIG. 2E, the control plane agent of the first endpoint device may receive a notification (e.g., 266 of FIG. 2E) from the orchestrator that the completed data is available. In embodiments, the notification may include the information regarding the secured storage location.

At operation 324, as discussed above in reference to FIG. 2E, the control plane agent of the first endpoint device may use the information (included in the notification) regarding the secured storage location to obtain the completed data to configure the first endpoint device using the completed data.

The process of FIG. 3C may end following operation 324.

Figure 4:
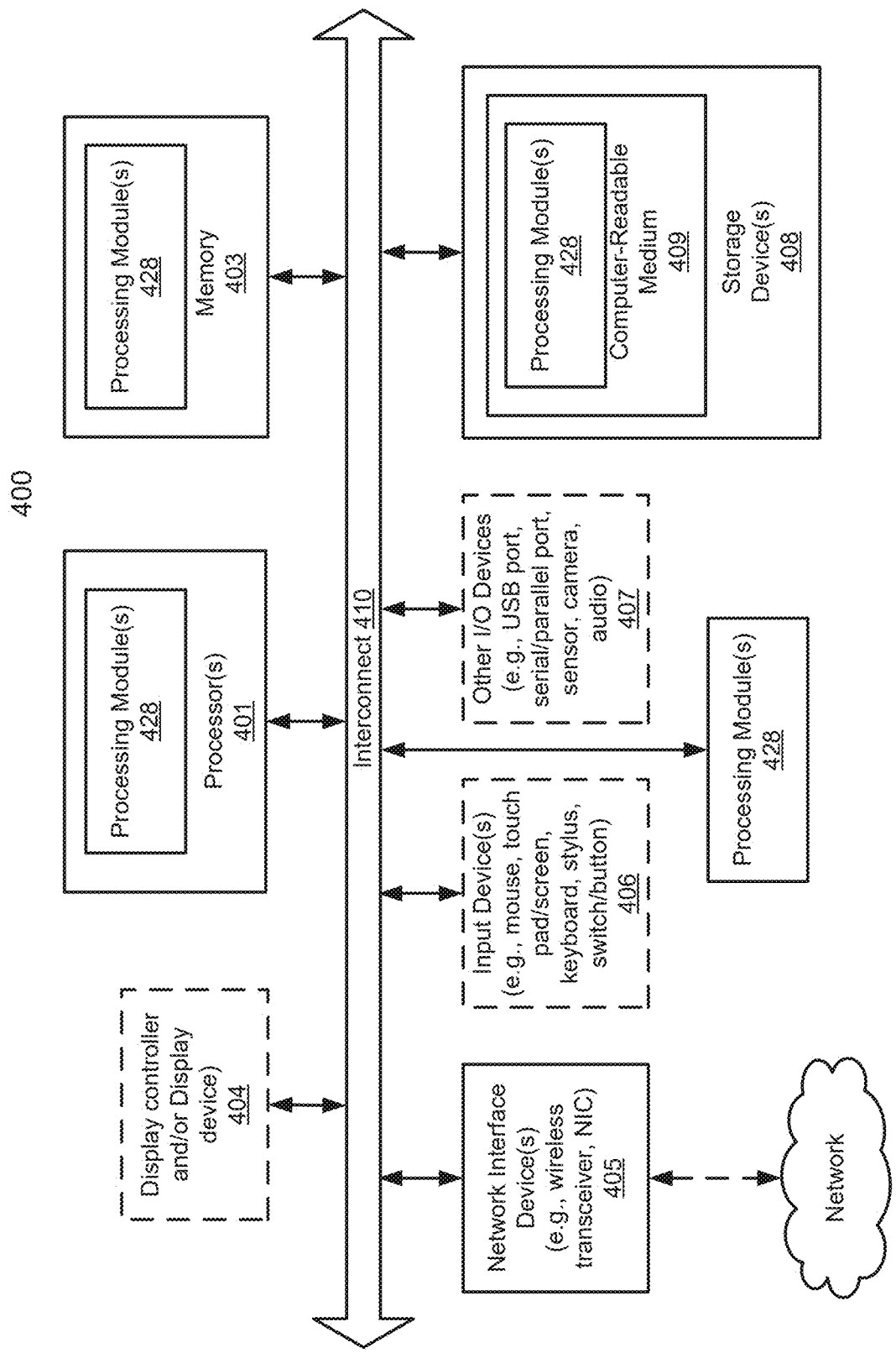
FIG. 4 shows a block diagram illustrating a data processing system in accordance with one or more embodiments disclosed herein.

Any of the components illustrated in FIGS. 1A-3C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing an edge compute environment comprising endpoint devices and an orchestrator, the method comprising:
    establishing an internal peer-to-peer file sharing infrastructure exclusive to the edge compute environment using the endpoint devices and the orchestrator, the internal peer-to-peer file sharing infrastructure using a torrent protocol and a sandboxed virtual network segment that connects the endpoint devices to one another;
    using the internal peer-to-peer file sharing infrastructure exclusive to the edge compute environment to configure a first endpoint device of the endpoint devices to receive, by a virtual machine (VM) of the first endpoint device, a torrent file from the orchestrator using a reverse torrent protocol, wherein the reverse torrent protocol causes a torrent client hosted by the VM to retrieve one or more torrent data chunks associated with the torrent file from one or more of the endpoint devices via the sandboxed virtual network segment; and
    configuring the first endpoint device to provide one or more computer-implemented services to one or more users associated with the edge compute environment based on the one or more torrent data chunks.

2. The method of claim 1, wherein the sandboxed virtual network segment is a Virtual extensible Local-Area Network (VXLAN).

3. The method of claim 2, wherein the sandboxed virtual network segment is overlaid onto a physical network that connects each of the endpoint devices to the orchestrator.

4. The method of claim 3, wherein the sandboxed virtual network segment isolates one or more operations of the internal peer-to-peer file sharing infrastructure from a native operating environment of each of the endpoint devices and from a connectivity between the endpoint devices and the orchestrator.

5. The method of claim 2, further comprising:
    merging, by the VM, the one or more torrent data chunks into a completed data;
    storing, by the VM, the completed data into a secured storage location within the endpoint device; and
    using, by a first control plane agent of the first endpoint device, the completed data to configure the first endpoint device to obtain an updated first endpoint device that provides the one or more computer-implemented services associated with the completed data.

6. The method of claim 5, wherein using, by the first control plane agent of the first endpoint device, the completed data to configure the first endpoint device comprises:
    sending, by the VM and to the orchestrator, a confirmation that the completed data is available in the first endpoint device, the confirmation including information regarding the secured storage location;
    receiving, by the first control plane agent, a notification from the orchestrator that the completed data is available, the notification including the information regarding the secured storage location; and
    using, by the first control plane agent, the information regarding the secured storage location to obtain the completed data to configure the first endpoint device using the completed data.

7. The method of claim 6, wherein the first control plane agent and the secured storage location are not hosted within the VM.

8. The method of claim 1,
    wherein the torrent file is cryptographically secured and comprises a torrent signature added by the orchestrator, and the method further comprises:
        verifying, by the first VM, an authenticity of the torrent file by cryptographically verifying the torrent signature added by the orchestrator with a verification mechanism, the verification mechanism being provided to the first endpoint device when the first endpoint device was initially onboarded onto the edge compute environment.

9. The method of claim 1, further comprising:
    comparing, by the VM, a hash of each of the one or more torrent data chunks to one or more hashes contained in the torrent file.

10. A non-transitory machine-readable medium having instructions stored therein, which when executed by endpoint devices and an orchestrator of an edge compute environment, cause the endpoint devices and the orchestrator to perform operations comprising:
    establishing an internal peer-to-peer file sharing infrastructure exclusive to the edge compute environment using the endpoint devices and the orchestrator, the internal peer-to-peer file sharing infrastructure using a torrent protocol and a sandboxed virtual network segment that connects the endpoint devices to one another;
    using the internal peer-to-peer file sharing infrastructure exclusive to the edge compute environment to configure a first endpoint device of the endpoint devices to receive, by a virtual machine (VM) of the first endpoint device, a torrent file from the orchestrator using a reverse torrent protocol, wherein the reverse torrent protocol causes a torrent client hosted by the VM to retrieve one or more torrent data chunks associated with the torrent file from one or more of the endpoint devices via the sandboxed virtual network segment; and
    configuring the first endpoint device to provide one or more computer-implemented services to one or more users associated with the edge compute environment based on the one or more torrent data chunks.

11. The non-transitory machine-readable medium of claim 10, wherein the sandboxed virtual network segment is a Virtual extensible Local-Area Network (VXLAN).

12. The non-transitory machine-readable medium of claim 11, wherein the sandboxed virtual network segment is overlaid onto a physical network that connects each of the endpoint devices to the orchestrator.

13. The non-transitory machine-readable medium of claim 12, wherein the sandboxed virtual network segment isolates one or more operations of the internal peer-to-peer file sharing infrastructure from a native operating environment of each of the endpoint devices and from a connectivity between the endpoint devices and the orchestrator.

14. The non-transitory machine-readable medium of claim 11, wherein the operations further comprise:
merging, by the VM, the one or more torrent data chunks into a completed data;
storing, by the VM, the completed data into a secured storage location within the first endpoint device; and
using, by a first control plane agent of the first endpoint device, the completed data to configure the first endpoint device to obtain an updated first endpoint device that provides the one or more computer-implemented services associated with the completed data.

15. An edge compute environment comprising:
one or more endpoint devices; and
an orchestrator,
wherein at least one of the one or more endpoint devices or the orchestrator comprises a processor and a memory coupled to the processor, wherein the memory that stores instructions that, when executed by the processor, causes the processor to perform operations comprising:
establishing an internal peer-to-peer file sharing infrastructure exclusive to the edge compute environment using the endpoint devices and the orchestrator, the internal peer-to-peer file sharing infrastructure using a torrent protocol and a sandboxed virtual network segment that connects the endpoint devices to one another;
using the internal peer-to-peer file sharing infrastructure exclusive to the edge compute environment to configure a first endpoint device of the endpoint devices to receive, by a virtual machine (VM) of the first endpoint device, a torrent file from the orchestrator using a reverse torrent protocol, wherein the reverse torrent protocol causes a torrent client hosted by the VM to retrieve one or more torrent data chunks associated with the torrent file from one or more of the endpoint devices via the sandboxed virtual network segment; and
configuring the first endpoint device to provide one or more computer-implemented services to one or more users associated with the edge compute environment based on the one or more torrent data chunks.

16. The edge compute environment of claim 15, wherein the sandboxed virtual network segment is a Virtual extensible Local-Area Network (VXLAN).

17. The edge compute environment of claim 16, wherein the sandboxed virtual network segment is overlaid onto a physical network that connects each of the one or more endpoint devices to the orchestrator.

18. The edge compute environment of claim 17, wherein the sandboxed virtual network segment isolates one or more operations of the internal peer-to-peer file sharing infrastructure from a native operating environment of each of the endpoint devices and from a connectivity between the one or more endpoint devices and the orchestrator.

19. The edge compute environment of claim 16, the operations further comprising:
merging, by the first VM, the one or more torrent data chunks into a completed data;
storing, by the VM, the completed data into a secured storage location within the first endpoint device; and
using, by a first control plane agent of the first endpoint device, the completed data to configure the first endpoint device to obtain an updated first endpoint device that provides the one or more computer-implemented services associated with the completed data.

20. The edge compute environment of claim 16, wherein the torrent file is cryptographically secured and comprises a torrent signature added by the orchestrator, and the operations further comprise: verifying, by the VM, an authenticity of the torrent file by cryptographically verifying the torrent signature added by the orchestrator with a verification mechanism, the verification mechanism being provided to the first endpoint device when the first endpoint device was initially onboarded onto the edge compute environment.

\* \* \* \* \*